(12) United States Patent
Yasunori et al.

(10) Patent No.: US 12,081,249 B2
(45) Date of Patent: Sep. 3, 2024

(54) ONBOARD RELAY APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hiromichi Yasunori, Yokkaichi (JP); Makoto Chujo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 76 days.

(21) Appl. No.: 17/757,802

(22) PCT Filed: Dec. 4, 2020

(86) PCT No.: PCT/JP2020/045192
§ 371 (c)(1),
(2) Date: Jun. 21, 2022

(87) PCT Pub. No.: WO2021/131603
PCT Pub. Date: Jul. 1, 2021

(65) Prior Publication Data
US 2022/0416825 A1    Dec. 29, 2022

(30) Foreign Application Priority Data
Dec. 24, 2019 (JP) .................................. 2019-233528

(51) Int. Cl.
*H04B 3/58* (2006.01)
*B60R 16/02* (2006.01)
(Continued)

(52) U.S. Cl.
CPC ....... *H04B 1/0475* (2013.01); *B60R 16/0215* (2013.01); *B60R 16/03* (2013.01)

(58) Field of Classification Search
CPC ... H04B 1/0475; B60R 16/0215; B60R 16/03; B60R 16/0231; H04L 12/28; H04L 12/46
(Continued)

(56) References Cited

U.S. PATENT DOCUMENTS 10,911,264 B2 * 2/2021 Ishizuka ................ H04L 12/46
2004/0228102 A1   11/2004 Sugawara et al.
(Continued)

FOREIGN PATENT DOCUMENTS

JP    2012-175031 A    9/2012

OTHER PUBLICATIONS

International Search Report, Application No. PCT/JP2020/045192, mailed Feb. 16, 2021. ISA/Japan Patent Office.

*Primary Examiner* — Anh V La
(74) *Attorney, Agent, or Firm* — Honigman LLP

(57) ABSTRACT

An onboard relay apparatus, connected to a plurality of onboard devices and relays communication to the onboard devices, is provided on a roof and includes a branch line connector connected to an onboard load; a main line connector connected to a power supply apparatus supplies power and a second onboard relay apparatus, which are included in the plurality of onboard loads, provided in an area other than the roof via a power line and a communication line provided on a pillar of the vehicle; and a control unit configured to control power supplied from the power supply apparatus via a power line provided on the pillar and distributed to the onboard load via one of a plurality of power lines provided on the roof and controls relaying communication to the onboard load and the second onboard relay apparatus.

17 Claims, 9 Drawing Sheets

(51) Int. Cl.
*B60R 16/03* (2006.01)
*H04B 1/04* (2006.01)

(58) Field of Classification Search
USPC ............... 340/425.1, 425.5, 635, 657, 636.1
See application file for complete search history.

(56) References Cited

U.S. PATENT DOCUMENTS

2017/0253199 A1* 9/2017 Tsunoda .............. B60R 16/0215
2018/0043849 A1 2/2018 Ishibashi et al.
2019/0029107 A1 1/2019 Nagashima et al.
2019/0126864 A1 5/2019 Takamatsu et al.
2019/0308569 A1* 10/2019 Ashibe ................... B60R 16/02
2020/0062198 A1 2/2020 Mizushita et al.

* cited by examiner

ONBOARD RELAY APPARATUS

CROSS-REFERENCE TO RELATED APPLICATIONS

This application is the U.S. national stage of PCT/JP2020/045192 filed on Dec. 4, 2020, which claims priority of Japanese Patent Application No. JP 2019-233528 filed on Dec. 24, 2019, the contents of which are incorporated herein.

TECHNICAL FIELD

The present disclosure relates to an onboard relay apparatus.

BACKGROUND

Various onboard devices, such as power supply apparatuses, communication apparatuses, and the like, are installed in vehicles. Wire harnesses including communication lines for communication between onboard devices and power lines for supplying power to the onboard devices are provided in vehicles. A wire harness is provided on the pillar of a vehicle, for example (see JP 2018-196174A, for example).

With recent increases in the number of onboard devices installed in vehicles, arranging wire harnesses inside a vehicle has also become problematically more complicated. For the wire harness of JP 2018-196174A, more needs to be investigated regarding increased numbers of wire harnesses provided on (routed through) a pillar.

In light of the foregoing, the present disclosure provides an onboard relay apparatus capable of suppressing an increase in the number of wire harnesses, for communication lines, power lines, and the like, provided on a pillar.

SUMMARY

An onboard relay apparatus according to an aspect of the present disclosure is an onboard relay apparatus which is one of a plurality of onboard relay apparatuses, which are installed in a vehicle, connected to a plurality of onboard devices, and relay communication to the plurality of onboard devices, provided on a roof of the vehicle, the plurality of onboard devices including an onboard load provided on the roof and a power supply apparatus that supplies power and a second onboard relay apparatus provided in an area other than the roof, including: a branch line connector connected to the onboard load via a power line and a communication line provided on the roof a main line connector connected to the power supply apparatus and the second onboard relay apparatus via a power line and a communication line provided on a pillar of the vehicle; and a control unit configured to control supplying and cutting off power supplied from the power supply apparatus via a power line provided on the pillar and distributed to the onboard load via one of a plurality of power lines provided on the roof, and to control relaying communication to the onboard load and the second onboard relay apparatus.

Advantageous Effects of Present Disclosure

According to an aspect of the present disclosure, an increase in the number of communication lines and power lines provided on a pillar can be suppressed.

DETAILED DESCRIPTION OF PREFERRED EMBODIMENTS

Figure 1:
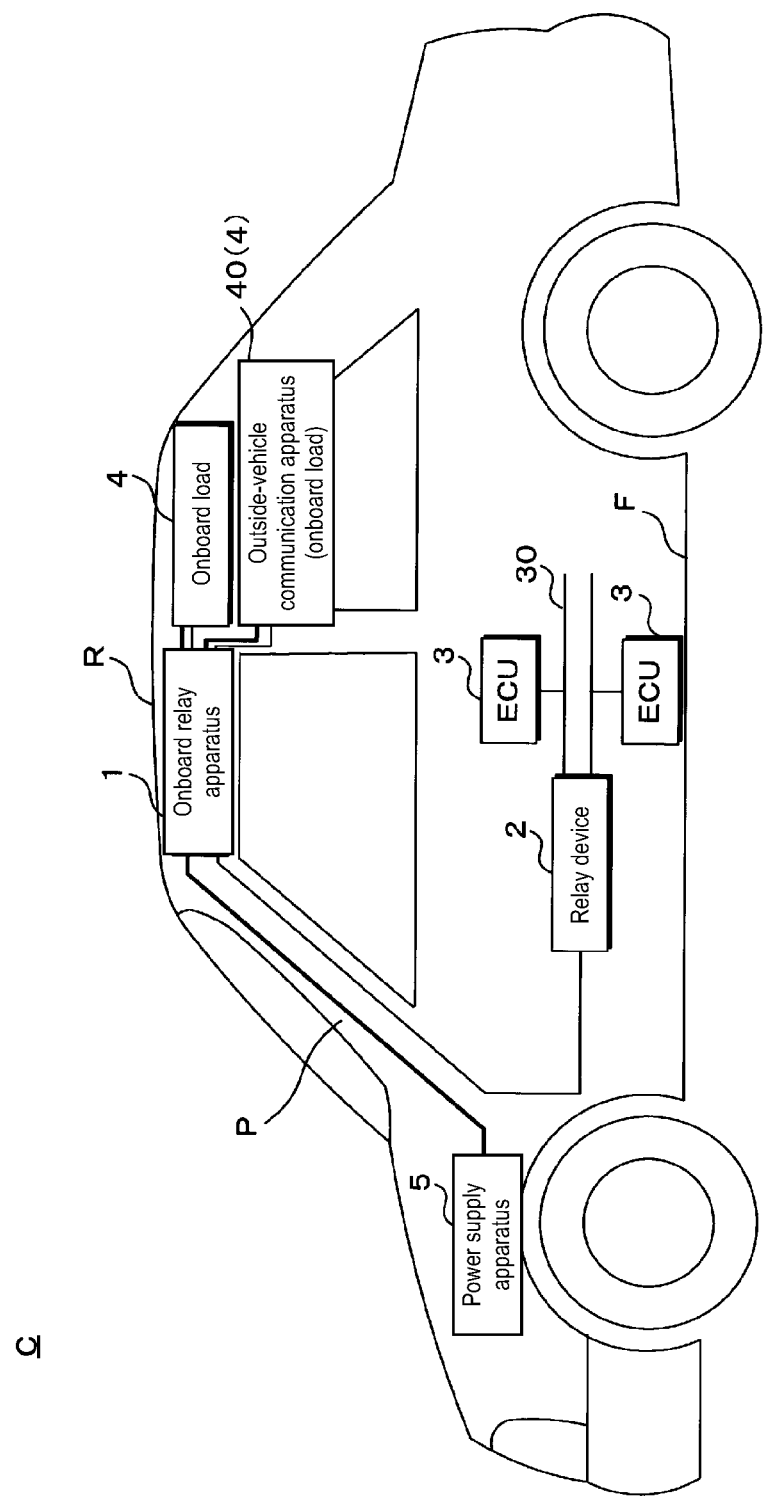
FIG. 1 is a schematic diagram illustrating the configuration of a vehicle installed with an onboard relay apparatus according to a first embodiment.

Firstly, embodiments of the present disclosure will be listed and described. One or more parts of the embodiments described below may be combined in a discretionary manner.

First Aspect

An onboard relay apparatus according to a first aspect of the present disclosure is an onboard relay apparatus which is one of a plurality of onboard relay apparatuses, which are installed in a vehicle, connected to a plurality of onboard devices, and relay communication to the plurality of onboard devices, provided on a roof of the vehicle, the plurality of onboard devices including an onboard load provided on the roof and a power supply apparatus that supplies power and a second onboard relay apparatus provided in an area other than the roof, including: a branch line connector connected to the onboard load via a power line and a communication line provided on the roof a main line connector connected to the power supply apparatus and the second onboard relay apparatus via a power line and a communication line provided on a pillar of the vehicle; and a control unit configured to control supplying and cutting off power supplied from the power supply apparatus via a power line provided on the pillar and distributed to the onboard load via one of a plurality of power lines provided on the roof, and to control relaying communication to the onboard load and the second onboard relay apparatus.

According to the first aspect, the onboard relay apparatus is provided on the roof of the vehicle and connected to the power supply apparatus, the onboard load, and the second onboard relay apparatus. The vehicle is installed with a plurality of the onboard loads. The plurality of onboard loads are provided on the roof of the vehicle. The plurality of onboard loads are connected to the branch line connector of the onboard relay apparatus via a communication line and a power line, for example via a wire harness, provided on the roof. The power supply apparatus is connected to the main line connector of the onboard relay apparatus via a communication line and a power line provided on the pillar of the vehicle. The onboard relay apparatus supplies and cuts off the power supplied from the power supply apparatus via a power supply line provided on the pillar and distributed to the onboard loads via power supply lines provided on the roof. The power supply apparatus and the plurality of onboard loads are connected via the onboard relay apparatus. In other words, the power supply apparatus and the plurality of onboard loads are not individually connected via a communication line and a power supply line. Thus, an increase to the number of communication lines and power lines provided on the pillar can be suppressed. The second onboard relay apparatus is connected to the main line connector of the onboard relay apparatus via a communication line and a power supply line provided on the pillar of the vehicle. The second onboard relay apparatus, for example, is connected to a plurality of control apparatuses that control driving the onboard loads and relays the communication of the control apparatuses. A control apparatus is an onboard electronic control unit (ECU), for example. The onboard relay apparatus relays communication from the second onboard relay apparatus to the onboard load. The communication from the second onboard relay apparatus is communication relayed from the second onboard relay apparatus for the control apparatus to control the onboard load. The second onboard relay apparatus and the plurality of onboard loads are connected via the onboard relay apparatus. In other words, the second relay apparatus and the plurality of onboard loads are not individually connected. Thus, an increase to the number of communication lines and power supply lines provided on the pillar can be suppressed.

Second Aspect

The onboard relay apparatus according to a second aspect of the present disclosure further includes a circuit board including the branch line connector and the main line connector, wherein the circuit board includes a communication circuit disposed on a surface of the circuit board on the roof side for communicating with the onboard load and the second onboard relay apparatus and a power supply circuit disposed on a surface of the circuit board on a floor side of the vehicle for distributing power supplied from the power supply apparatus to the onboard load.

According to the second aspect, the circuit board includes the communication circuit on the surface on the roof side of the vehicle. The circuit board includes a power supply circuit on the surface on the floor side of the vehicle. In other words, the communication circuit and the power supply circuit are separated in the vertical direction. Thus, noise propagating from the communication circuit to the power supply circuit and noise propagating from the power supply circuit to the communication circuit can be suppressed. Because noise propagation to the communication circuit is suppressed, communication between the second relay apparatus and the onboard loads can be stably relayed. By using both surfaces (the roof side surface and the floor side surface) of the circuit board, the onboard relay apparatus can be made compact. In other words, the area required for attaching the onboard relay apparatus is decreased, and the limited area of the roof can be effectively used. The power supplied from the power supply apparatus is distributed at the power supply circuit and a high voltage current occurs at the power supply circuit. Also, because the power supply circuit includes a relay, a fuse, and the like, the amount of heat generated at the power supply circuit is increased. The power supply circuit is formed on the surface of the circuit board on the floor side of the vehicle, in other words, the surface on the vehicle cabin side. Thus, the heat generated at the power supply circuit can be effectively dissipated to the vehicle cabin where there is air conditioning.

Third Aspect

The onboard relay apparatus according to a third aspect of the present disclosure further includes a circuit board including the branch line connector and the main line connector, wherein the circuit board includes a first substrate disposed on the roof side and including a communication circuit for communicating with the onboard load and the second onboard relay apparatus and a second substrate disposed on a floor side of the vehicle and including a power supply circuit that distributes power supplied from the power supply apparatus to the onboard load; and the communication circuit is supplied with power from the power supply circuit.

According to the third aspect, the first substrate includes the communication circuit and is disposed on the roof side (upper side of the vehicle). The second substrate includes the power supply circuit and is disposed on the floor side (lower side of the vehicle). In other words, the communication circuit and the power supply circuit are separated in the vertical direction. Thus, noise propagating from the communication circuit to the power supply circuit and noise propagating from the power supply circuit to the communication circuit can be suppressed. Because noise propagation to the communication circuit is suppressed, communication between the second relay apparatus and the onboard loads can be stably relayed. The area of the roof of the vehicle where the onboard relay apparatus and the onboard loads can be placed is limited. By disposing the first substrate and the second substrate aligned in the vertical direction, the onboard relay apparatus can be made compact. In other words, the area required for attaching the onboard relay apparatus is decreased, and the limited area of the roof can be effectively used. The power supplied from the power supply apparatus is distributed at the power supply circuit and a high voltage current occurs at the power supply circuit. Also, because the power supply circuit includes a relay, a fuse, and the like, the amount of heat generated at the power supply circuit is increased. Because the power supply circuit is formed on the second substrate, the heat generated at the power supply circuit can be effectively dissipated to the cabin of the vehicle where there is air conditioning.

Fourth Aspect

In the onboard relay apparatus according to a fourth aspect of the present disclosure, the first substrate and the second substrate are disposed facing one another; the first substrate includes the communication circuit and one of the branch line connector or the main line connector on a surface facing the second substrate; the second substrate includes the power supply circuit and the other one of the branch line connector or the main line connector on a surface facing the first substrate; and the branch line connector and the main line connector overlap in a thickness direction.

According to the fourth aspect, the first substrate includes the communication circuit and one of the branch line connector or the main line connector on the surface of the first substrate facing the second substrate. The second substrate includes the power supply circuit and the other one of the branch line connector or the main line connector on the surface of the second substrate facing the first substrate. The onboard relay apparatus is a rectangular parallelepiped, for example. The branch line connector is provided on a first side surface of the onboard relay apparatus. The main line connector is provided on a second side surface which is the surface opposite the first side surface of the onboard relay apparatus. The branch line connector and the main line connector are provided on different side surfaces and overlap in the thickness direction of the onboard relay apparatus. Because they overlap in the thickness direction, the height of the side surfaces of the onboard relay apparatus can be reduced. In other words, the thickness of the onboard relay apparatus can be reduced.

Fifth Aspect

The onboard relay apparatus according to a fifth aspect of the present disclosure further includes a noise suppression member that suppresses noise propagation disposed between the communication circuit and the power supply circuit.

According to the fifth aspect, the noise suppression member effectively suppresses noise propagating from the communication circuit to the power supply circuit and noise propagating from the power supply circuit to the communication circuit. Because noise propagation to the communication circuit is suppressed, communication between the second relay apparatus and the onboard loads can be more stably relayed.

Sixth Aspect

The onboard relay apparatus according to a sixth aspect of the present disclosure further includes a circuit board including the branch line connector and the main line connector, wherein the onboard load includes an outside-vehicle communication apparatus configured to communicate with a communication target outside of the vehicle; the circuit board includes a plurality of substrates provided from the roof side toward a floor side of the vehicle; surfaces of the plurality of substrates include a surface on which the outside-vehicle communication apparatus is mounted, a surface on which a communication circuit for communicating with the onboard load and the second onboard relay apparatus is formed, and a surface on which a power supply circuit for distributing power supplied from the power supply apparatus to the onboard load is formed; and the surface on which the outside-vehicle communication apparatus is mounted, the surface on which the communication circuit is formed, and the surface on which the power supply circuit is formed are arranged in this order from the roof side to the floor side and form a multilayer structure.

According to the sixth aspect, the circuit board includes the plurality of substrates. The surfaces of the plurality of substrates includes the surface on which the outside-vehicle communication apparatus is mounted, the surface on which the communication circuit is formed, and the surface on which the power supply circuit is formed. A circuit for implementing the function of the outside-vehicle communication apparatus is formed on the surface on which the outside-vehicle communication apparatus is mounted, for example. The onboard relay apparatus communicates with a communication target outside of the vehicle via the mounted outside-vehicle communication apparatus. An increase in the number of communication lines and power lines for connecting the onboard relay apparatus and the outside-vehicle communication apparatuses can be suppressed. The surfaces of the plurality of substrates, the surface on which the outside-vehicle communication apparatus is mounted, the surface on which the communication circuit is formed, and the surface on which the power supply circuit is formed, in this order from the roof side toward the floor side of the vehicle form a multilayer structure. In other words, the circuit for implementing a function, the communication circuit, and the power supply circuit are separated from one another in the vertical direction. Thus, noise propagating from the circuits and noise propagating to the circuits can be suppressed. Because the surface on which the outside-vehicle communication apparatus is mounted is disposed on the roof side, the communications between the outside-vehicle communication apparatus and the communication target outside of the vehicle are easily stabilized. Also, connection (communication) between the antenna for outside-vehicle communication provided on the outer side of the roof (vehicle) and the mounted outside-vehicle communication apparatus can be easily performed. The power supplied from the power supply apparatus is distributed at the power supply circuit and a high voltage current occurs at the power supply circuit. Also, because the power supply circuit includes a relay, a fuse, and the like, the amount of heat generated at the power supply circuit is increased. Because the surface on which the power supply circuit is formed is disposed on the floor side, the heat generated at the power supply circuit can be effectively dissipated to the vehicle cabin where there is air conditioning.

Seventh Aspect

The onboard relay apparatus according to a seventh aspect of the present disclosure further includes a first noise suppression member that suppresses noise propagation disposed between the outside-vehicle communication apparatus and the communication circuit.

According to the seventh aspect, the first noise suppression member, for example an electromagnetic shielding member, is provided between the outside-vehicle communication apparatus and the communication circuit. The first noise suppression member effectively suppresses noise propagating from the mounted outside-vehicle communication apparatus and noise propagating to the outside-vehicle communication apparatus. Thus, communication via the mounted outside-vehicle communication apparatus can be more stably performed.

Eighth Aspect

The onboard relay apparatus according to an eighth aspect of the present disclosure further includes a second noise suppression member that suppresses noise propagation disposed between the communication circuit and the power supply circuit.

According to the eighth aspect, the second noise suppression member, for example an electromagnetic shielding member, is provided between the outside-vehicle communication apparatus and the communication circuit. The second noise suppression member effectively suppresses noise propagating from the communication circuit to the power supply circuit and noise propagating from the power supply circuit to the communication circuit. Because noise propagation to the communication circuit is suppressed, communication between the second relay apparatus and the onboard loads can be more stably relayed.

Ninth Aspect

The onboard relay apparatus according to a ninth aspect of the present disclosure further includes a circuit board including the branch line connector and the main line connector, wherein the onboard load includes an outside-vehicle communication apparatus configured to communicate with a communication target outside of the vehicle; the branch line connector includes a first branch line connector connected to the outside-vehicle communication apparatus and a second branch line connector connected to the onboard load other than the outside-vehicle communication apparatus; and the circuit board includes, on a surface of the circuit board on a roof side of the vehicle, the first branch line connector and a first circuit connected to the first branch line connector and, on a surface of the circuit board on a floor side of the vehicle, the second branch line connector, the main line connector, and a second circuit connected to the second branch line connector and the main line connector.

According to the ninth aspect, the circuit board includes the first branch line connector and the first circuit on the surface on the roof side of the vehicle. The circuit board includes the second branch line connector, the main line connector, and the second circuit on the surface on the floor side of the vehicle. The area of the roof of the vehicle where the onboard relay apparatus and the onboard loads can be placed is limited. By using both surfaces (the roof side surface and the floor side surface) of the circuit board, the onboard relay apparatus can be made compact. In other words, the area required for attaching the onboard relay apparatus is decreased, and the limited area of the roof can be effectively used. Many outside-vehicle communication apparatuses are provided on the upper portion of the roof. Because the first branch line connector is provided on the roof side of the circuit board, in other words the upper surface, communication lines and power lines for connecting the onboard relay apparatus and the outside-vehicle communication apparatuses can be easily disposed on (routed through) the roof. The length of the communication lines and the power lines can be decreased. Because the second circuit includes a relay, a fuse, and the like, the amount of heat generated at the second circuit is increased. The second circuit is formed on the surface of the circuit board on the floor side of the vehicle, in other words, the surface on the vehicle cabin side. Thus, the heat generated at the second circuit can be effectively dissipated to the vehicle cabin where there is air conditioning.

Tenth Aspect

In the onboard relay apparatus according to a tenth aspect of the present disclosure, the circuit board includes, inside the circuit board, a noise suppression member that suppresses noise propagation.

According to the present aspect, the noise suppression member is provided inside the circuit board, in other words, between the roof side surface and the floor side surface in the circuit board. The noise suppression member is an electromagnetic shielding member, for example. The noise suppression member suppresses noise propagating from the second circuit to the first circuit and noise propagating from the first circuit to the second circuit. Because noise propagation is suppressed, the onboard loads can be stably driven.

Eleventh Aspect

The onboard relay apparatus according to an eleventh aspect of the present disclosure further includes a circuit board including the branch line connector and the main line connector, wherein the onboard load includes an outside-vehicle communication apparatus configured to communicate with a communication target outside of the vehicle; the branch line connector includes a first branch line connector connected to the outside-vehicle communication apparatus and a second branch line connector connected to the onboard load other than the outside-vehicle communication apparatus; the circuit board includes a first substrate disposed on a roof side of the vehicle and including the first branch line connector and a first circuit connected to the first branch line connector, and a second substrate disposed on a floor side of the vehicle and including the second branch line connector, the main line connector, and a second circuit connected to the second branch line connector and the main line connector; and the first substrate and the second substrate are connected via a power line and a communication line.

According to the eleventh aspect, the first substrate is disposed on the roof side, in other words on the upper side of the vehicle. The second substrate is disposed on the floor side, in other words the lower side of the vehicle. The area of the roof of the vehicle where the onboard relay apparatus and the onboard loads can be placed is limited. By disposing the first substrate and the second substrate aligned in the vertical direction, the onboard relay apparatus can be made compact. In other words, the area required for attaching the onboard relay apparatus is decreased, and the limited area of the roof can be effectively used. Many outside-vehicle communication apparatuses are provided on the upper portion of the roof. Because the first branch line connector is provided on the roof side surface of the circuit board, in other words the upper surface, communication lines and power lines for connecting the onboard relay apparatus and the outside-vehicle communication apparatuses can be easily disposed on (routed through) the roof. The length of the communication lines and the power lines can be decreased. Because the second circuit includes a relay, a fuse, and the like, the amount of heat generated at the second circuit is increased. The second circuit is formed on the surface of the circuit board on the floor side of the vehicle, in other words, the surface on the vehicle cabin side. Thus, the heat generated at the second circuit can be effectively dissipated to the vehicle cabin where there is air conditioning.

Twelfth Aspect

In the onboard relay apparatus according to a twelfth aspect of the present disclosure, the first substrate and the second substrate are disposed facing one another; the first substrate includes the first branch line connector and the first circuit on a surface facing the second substrate; the second substrate includes the second branch line connector, the main line connector, and the second circuit on a surface facing the first substrate; and the first branch line connector, the second branch line connector, and the main line connector overlap in a thickness direction.

According to the twelfth aspect, the first substrate includes the first branch line connector and the first circuit on the surface facing the second substrate, in other words the floor side (lower side) surface. The second substrate includes the second branch line connector, the main line connector, and the second circuit on the surface facing the first substrate, in other words the roof side (upper side) surface. The onboard relay apparatus is a rectangular parallelepiped, for example. The first branch line connector is provided on a first side surface of the onboard relay apparatus. The second branch line connector and the main line connector are provided on a second side surface which is the surface opposite the first side surface of the onboard relay apparatus. The first branch line connector, the second branch line connector, and the main line connector are provided on different side surfaces and overlap in the thickness direction of the onboard relay apparatus. Because they overlap in the thickness direction, the height of the side surfaces of the onboard relay apparatus can be reduced. In other words, the thickness of the onboard relay apparatus can be reduced.

Thirteenth Aspect

In the onboard relay apparatus according to a thirteenth aspect of the present disclosure, the outside-vehicle communication apparatus is mounted on a surface of the first substrate opposite a surface facing the second substrate.

According to the present aspect, the outside-vehicle communication apparatus is mounted on the surface of the first substrate opposite the surface facing the second substrate, in other words the roof side surface of the first substrate. In other words, the outside-vehicle communication apparatus is built in the onboard relay apparatus. For example, a circuit for implementing the function of the outside-vehicle communication apparatus is formed on the roof side surface of the first substrate. An increase in the number of communication lines and power lines for connecting the onboard relay apparatus and the outside-vehicle communication apparatuses can be suppressed. Because the outside-vehicle communication apparatus is mounted on the roof side surface of the first substrate, communication between the outside-vehicle communication apparatus and the communication target outside of the vehicle is easily stabilized. Also, connection (communication) between the antenna for outside-vehicle communication provided on the outer side of the roof (vehicle) and the outside-vehicle communication apparatus mounted in the onboard relay apparatus can be easily performed.

Fourteenth Aspect

In the onboard relay apparatus according to a fourteenth aspect of the present disclosure, the first substrate includes, inside the first substrate, a first noise suppression member that suppresses noise propagation.

According to the fourteenth aspect, the first noise suppression member is provided inside the first substrate, in other words, between the roof side surface and the floor side surface in the first substrate. The first noise suppression member is an electromagnetic shielding member, for example. The first noise suppression member suppresses noise propagating to the circuit (mounted outside-vehicle communication apparatus) for implementing the function of the outside-vehicle communication apparatus and noise propagating from the circuit. Because noise propagating to the circuit for implementing the function of the outside-vehicle communication apparatus is suppressed, communication using the mounted outside-vehicle communication apparatus can be performed with stability.

Fifteenth Aspect

The onboard relay apparatus according to a fifteenth aspect of the present disclosure further includes a second noise suppression member that suppresses noise propagation disposed between the first substrate and the second substrate.

According to the fifteenth aspect, the second noise suppression member, for example an electromagnetic shielding member, is provided between the first substrate and the second substrate. The second noise suppression member suppresses noise propagating from the second circuit to the first circuit and noise propagating from the first circuit to the second circuit. Because noise propagation is suppressed, the onboard loads can be stably driven.

Sixteenth Aspect

The onboard relay apparatus according to a sixteenth aspect of the present disclosure further includes a circuit board including the branch line connector and the main line connector, wherein the onboard load includes an outside-vehicle communication apparatus configured to communicate with a communication target outside of the vehicle; the outside-vehicle communication apparatus is mounted on a surface of the circuit board on a roof side of the vehicle; and the circuit board includes, on a surface on a floor side of the vehicle, the branch line connector, the main line connector, and an electric circuit connected to the branch line connector and the main line connector and, inside, a noise suppression member that suppresses noise propagation.

According to the sixteenth aspect, the outside-vehicle communication apparatus is mounted on the roof side surface of the circuit board. In other words, the outside-vehicle communication apparatus is built in the onboard relay apparatus. For example, an electric circuit (outside-vehicle communication circuit) for implementing the function of the outside-vehicle communication apparatus is formed on the roof side surface of the circuit board. An increase in the number of communication lines and power lines for connecting the onboard relay apparatus and the outside-vehicle communication apparatuses can be suppressed. Because the outside-vehicle communication apparatus is mounted on the roof side surface of the circuit board, communication between the outside-vehicle communication apparatus and the communication target outside of the vehicle is easily stabilized. Also, connection (communication) between the antenna for outside-vehicle communication provided on the outer side of the roof (vehicle) and the outside-vehicle communication apparatus can be easily performed. The noise suppression member, for example an electromagnetic shield, is provided inside the circuit board, in other words, between the roof side surface and the floor side surface in the circuit board. The noise suppression member suppresses noise propagating from the electric circuit to the outside-vehicle communication circuit and noise propagating from the outside-vehicle communication circuit to the electric circuit. Because noise propagating to the circuit (outside-vehicle communication circuit) implementing the function of the outside-vehicle communication apparatus is suppressed, communication with the communication target outside of the vehicle can be performed with stability.

Seventeenth Aspect

The onboard relay apparatus according to a seventeenth aspect of the present disclosure further includes a lamp device including a lamp and a switch that outputs a signal indicating for the lamp to turn on or turn off, wherein the control unit turns on or turns off the lamp in accordance with the output signal.

According to the seventeenth aspect, the onboard relay apparatus includes a lamp device including a lamp and a switch that outputs a signal for the lamp to turn on or turn off. The lamp device is a map lamp, for example, and is integrally formed with the onboard relay apparatus. The switch of the map lamp outputs a signal indicating to turn on and a signal indicating to turn off. The control unit turns on or turns off the lamp of the map lamp in accordance with the turn on or turn off signal output from the map lamp. The onboard relay apparatus and the map lamp are integrally formed. Thus, the limited area of the roof can be effectively used. Thus, an increase to the number of communication lines and power lines provided on the roof can be suppressed.

The present disclosure will be described in detail below with reference to diagrams of embodiments of the present disclosure. An onboard relay apparatus 1 according to an embodiment of the present disclosure will be described with reference to the following diagrams. Note that the present disclosure is not limited to these examples. The present disclosure is defined by the scope of the claims, and all modifications that are equivalent to or within the scope of the claims are included.

First Embodiment

Figure 2:
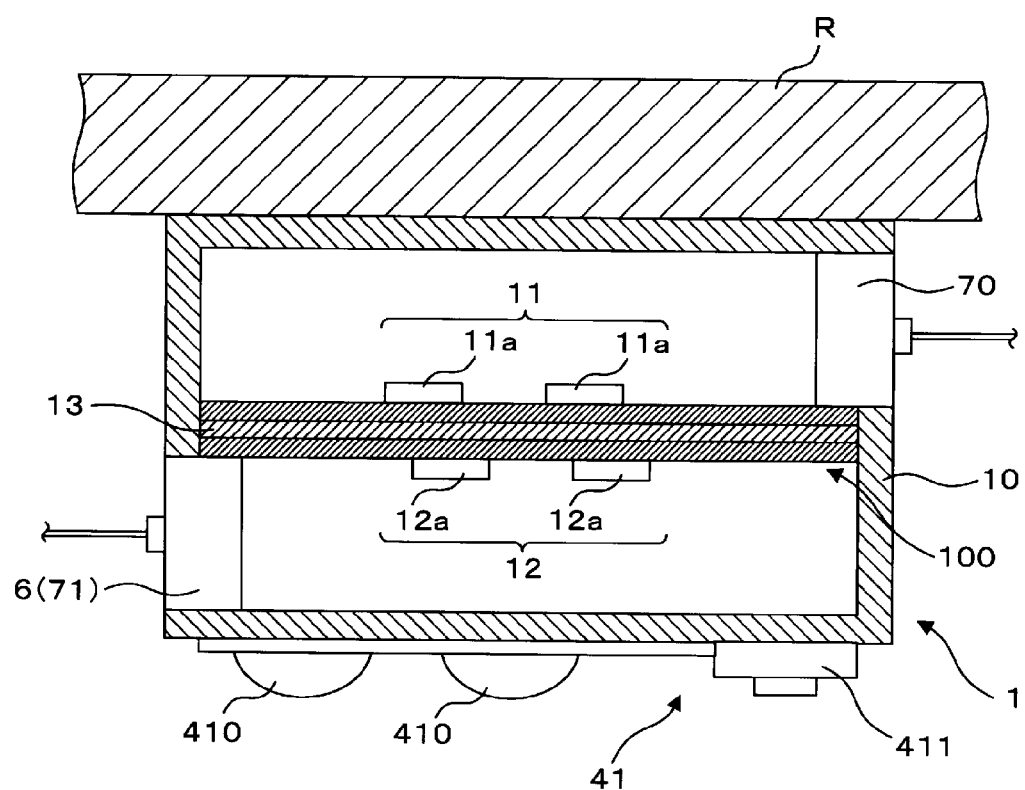
FIG. 2 is a schematic cross-sectional view illustrating the configuration of the onboard relay apparatus according to the first embodiment.

An embodiment will be described below with reference to diagrams. FIG. 1 is a schematic diagram illustrating the configuration of a vehicle C installed with the onboard relay apparatus 1 according to the first embodiment. FIG. 2 is a schematic cross-sectional view illustrating the configuration of the onboard relay apparatus 1 according to the first embodiment.

The vehicle C is installed with a plurality of onboard devices and a plurality of onboard relay apparatuses including the onboard relay apparatus 1 provided on a roof R of the vehicle C and a second onboard relay apparatus (hereinafter, referred to as a relay device) 2 provided in an area other than the roof R. The plurality of onboard relay apparatuses are connected to the plurality of onboard devices and relay communication (the transmission and reception of data) to the connected plurality of onboard devices. The plurality of onboard devices include an onboard load 4 provided on the roof R of the vehicle C that is driven by power. The plurality of onboard devices further includes an onboard ECU 3 that controls driving the onboard load 4 and a power supply apparatus 5 that supplies power. The onboard ECU 3 corresponds to a control apparatus. The vehicle C is installed with a plurality (in FIG. 1, two) of the onboard loads 4 and a plurality (in FIG. 1, two) of the onboard ECUs 3.

Each onboard load 4 is connected to the onboard relay apparatus 1 via a communication line and a power line, for example via a wire harness, provided on (routed though) the roof R. The details thereof will be described below. The communication line is compatible with communications using a communication protocol, such as a controller area network (CAN, registered trademark) or Ethernet (registered trademark). The onboard relay apparatus 1 and each onboard load 4 are capable of communicating with one another. The relay device 2, the onboard ECUs 3, and the power supply apparatus 5 are provided in an area other than on the roof R. An area other than the roof R includes an engine room of the vehicle C, a floor F of the vehicle C, and a floor portion of the vehicle C, for example. The floor portion of the vehicle C includes the lower portion of the back seat, for example.

The power supply apparatus 5 is a battery for the vehicle C and is constituted by a lead acid battery or a secondary battery such as a lithium ion battery. The power supply apparatus 5 is disposed in an area other than the roof R, for example, in the engine room provided at the front portion of the vehicle C. The power supply apparatus 5 supplies power (performs power supply) and is charged by power generated by a not-illustrated alternator (power generator) installed in the vehicle C. Also, in a case where the vehicle C is a plug-in hybrid vehicle or an electric vehicle, the power supply apparatus 5 is charged by a not-illustrated charging apparatus located outside of the vehicle C. The power supply apparatus 5 may include a not-illustrated onboard ECU 3 for controlling power supply and charging.

The onboard relay apparatus 1 and the power supply apparatus 5 are connected via a communication line and a power line, for example via a wire harness, provided in (routed though) a pillar P of the vehicle C. The communication line and power line that connect the onboard relay apparatus 1 and the power supply apparatus 5 are provided along the pillar P (the A pillar on the left side) on the front and left side of the vehicle C, for example. The communication line and the power line may be provided in a different pillar P to the pillar P on the front and left side of the vehicle C, for example, the pillar P (the C pillar on the left side) on the back and left side of the vehicle C. The communication line is compatible with communications using a communication protocol, such as CAN, Ethernet, or the like. In FIG. 1, the communication line connecting the onboard relay apparatus 1 and the power supply apparatus 5 is omitted. The power supplied from the power supply apparatus 5 via the power line provided on the pillar P is distributed at the onboard relay apparatus 1 and supplied to the onboard loads 4. The details thereof will be described below.

The onboard ECUs 3 are provided in area other than the roof R, for example, in the floor portion of the vehicle C such as in the lower portion of the back seat and are communicatively connected to the relay device 2 via an in-vehicle LAN 30 compatible with a communication protocol, such as CAN, Ethernet, or the like. The onboard ECU 3 controls driving the onboard load 4. The details thereof will be described below. The onboard ECUs 3 may include an ECU relating to automated driving of the vehicle C, for example.

The onboard ECU 3 includes a not-illustrated control unit, storage unit, and in-vehicle communication unit. The storage unit of the onboard ECU 3 is constituted by a volatile memory element such as random access memory (RAM) or a non-volatile memory element, such as read only memory (ROM), electrically erasable programmable ROM (EEPROM), flash memory, or the like. A program or data of the onboard ECU 3 is stored in the storage unit of the onboard ECU 3.

The control unit of the onboard ECU 3 is constituted by a central processing unit (CPU), a micro processing unit (MPU), or the like. The control unit of the onboard ECU 3 executes control processing by reading out and executing a program or data stored in the storage unit of the onboard ECU 3 and controls driving the onboard load 4. The in-vehicle communication unit of the onboard ECU 3 is an I/O (Input/Output) interface that uses a communication protocol, such as CAN, Ethernet, or the like. The control unit of the onboard ECU 3 communicates with the relay device 2 using the in-vehicle LAN 30 via an in-vehicle communication unit of the onboard ECU 3. Also, the control unit of the onboard ECU 3 communicates with the other onboard ECUs 3 connected to the in-vehicle LAN 30 via the in-vehicle communication unit of the onboard ECU 3. One or more of the onboard ECUs 3 (the in-vehicle communication unit of one or more of the onboard ECUs 3) may be not connected to the relay device 2, provided on the pillar P of the vehicle C, and connected to the onboard relay apparatus 1 via a communication line compatible with communications using a communication protocol, such as CAN, Ethernet, or the like.

The relay device 2 is connected to the plurality of onboard ECUs 3 via the in-vehicle LAN 30. The relay device 2, for example, is a gateway that controls segments of a plurality of systems, such as the onboard ECU 3 of a control system, the onboard ECU 3 of a safety system, the onboard ECU 3 of a body system, and the like and relays communications between the onboard ECUs 3 of these segments. Also, the relay device 2 may be configured as a functional unit of the body ECU that controls the entire vehicle C.

The relay device 2 is provided in an area other than the roof R, for example, the floor portion of the vehicle C, such as the lower portion of the back seat. The onboard relay apparatus 1 and the relay device 2 are connected via a communication line and a power line, for example via a wire harness, provided in (routed though) the pillar P of the vehicle C. The communication line and power line that connect the onboard relay apparatus 1 and the relay device 2 are provided along the pillar P (the A pillar on the left side) on the front and left side of the vehicle C, for example. The communication line and the power line may be provided in a different pillar P to the pillar P on the front and left side of the vehicle C, for example, the pillar P (the C pillar on the left side) on the back and left side of the vehicle C. The communication line is compatible with communications using a communication protocol, such as CAN, Ethernet, or the like. The relay device 2 communicates with the onboard relay apparatus 1. In FIG. 1, the power line connecting the onboard relay apparatus 1 and the relay device 2 is omitted. The relay device 2 includes a not-illustrated control unit, storage unit, first in-vehicle communication unit, and second in-vehicle communication unit.

The control unit of the relay device 2 is constituted by a CPU, an MPU, or the like and executes various types of control processing and calculation processing by reading out and executing a control program and data stored in advance in the storage unit. The control unit of the relay device 2 controls the communications with the onboard ECU 3 (relays the communications of the onboard ECU 3) and the communications with the onboard relay apparatus 1 by executing a control program stored in the storage unit.

The storage unit of the relay device 2 is constituted by a volatile memory element such as RAM or a non-volatile memory element, such as ROM, EEPROM, flash memory, or the like. The control program is stored in advance in the storage unit.

The first in-vehicle communication unit is an I/O interface that uses a communication protocol, such as CAN, Ethernet, or the like. A plurality of the first in-vehicle communication units are provided. A communication line constituting the in-vehicle LAN 30 compatible with a communication protocol, such as CAN, Ethernet, or the like, is connected to each one of the first in-vehicle communication units. By providing the plurality of first in-vehicle communication units in this manner, the in-vehicle LAN 30 can be divided in a plurality of segments. The onboard ECU 3 connects to the segment in accordance with the function of the onboard ECU 3, for example, the control system function, the safety system function, the body system function, or the like. The control unit of the relay device 2 communicates with the onboard ECU 3 connected to the in-vehicle LAN 30 via the first in-vehicle communication unit. The control unit also communicates with another not-illustrated onboard device connected to the in-vehicle LAN 30.

The second in-vehicle communication unit is connected to a communication line (wire harness) compatible with communications using a communication protocol, such as CAN, Ethernet, or the like and is connected to the onboard relay apparatus 1 via the communication line. The communication line is provided on the pillar P of the vehicle C. The control unit of the relay device 2 communicates with the onboard relay apparatus 1 via the second in-vehicle communication unit. The control unit of the relay device 2 relays communication from the onboard ECU 3 to the onboard relay apparatus 1 via the first in-vehicle communication units and the second in-vehicle communication unit. Also, the communication from the onboard relay apparatus 1 is relayed to the onboard ECU 3. For example, the relay device 2 relays communication from the onboard ECU 3 to the onboard relay apparatus 1. The communication from the onboard ECU 3 is a signal (program or data) output by the onboard ECU 3 to control a predetermined onboard load 4 (the onboard load 4 targeted for control), for example. The relay device 2 relays (outputs), to the onboard ECU 3, a signal (program or data) output from the onboard relay apparatus 1, for example, a signal acquired by the onboard relay apparatus 1 from an outside-vehicle communication apparatus 40 described below. In other words, the onboard relay apparatus 1 and the onboard ECU 3 are capable of communicating with one another via the relay device 2.

The onboard load 4 is provided on the roof R and is driven by power. The onboard load 4 is not required to be provided on the roof R and may be provided in the area near the roof R, for example, on the roof R side (upper side) of the pillar P. The onboard load 4 includes, for example, an in-vehicle camera 42 (see FIG. 3), a display apparatus, and a map lamp 41 (see FIG. 3) and a room lamp. The in-vehicle camera 42 is a driver monitor camera, for example. The display apparatus is a roof display, for example. The onboard load 4 further includes the outside-vehicle communication apparatus 40 that communicates with the communication target outside of the vehicle C.

The outside-vehicle communication apparatus 40 includes an analog communication apparatus 401 (see FIG. 3) that performs analog communication and a digital communication apparatus 402 (see FIG. 3) that performs digital communication. The analog communication apparatus 401 includes a radio receiver, for example. The radio receiver receives radio waves transmitted from a not-illustrated radio tower (radio wave tower). In other words, the radio receiver communicates with a radio tower (a radio wave transmission apparatus provided in the radio tower). The radio tower is included in the communication target outside of the vehicle C. The vehicle C may be installed with a plurality of the analog communication apparatuses 401.

The digital communication apparatus 402, for example, includes a communication apparatus for wireless communication using a mobile communication protocol, such as Long-Term Evolution (LTE, registered trademark), 4G, 5G, or the like. The apparatus is a telematics control unit (TCU), for example. The digital communication apparatus 402 includes a communication apparatus for wireless communication using a wireless communication protocol, such as Wi-Fi (registered trademark), Bluetooth (registered trademark), or the like. A single digital communication apparatus 402 may perform communication via a plurality of different communication protocols. For example, the digital communication apparatus 402, in addition to performing wireless communication using a mobile communication protocol, such as LTE, 4G, 5G, or the like, may perform wireless communication using a wireless communication protocol, such as Wi-Fi, Bluetooth, or the like. The vehicle C may be installed with a plurality of the digital communication apparatuses 402. For example, the digital communication apparatus 402 that communicates via LTE, 4G, or 5G and the digital communication apparatus 402 that communicates via Wi-Fi or Bluetooth may both be installed in the vehicle C. The digital communication apparatus 402 communicates with a computer (external server) such as a server connected to an outside-vehicle network such as the Internet, a public network, or the like via the outside-vehicle network. Also, the digital communication apparatus 402 communicates with a communication terminal such as a smart phone carried by the operator of the vehicle C.

The digital communication apparatus 402 includes a communication apparatus relating to intelligent transport systems (ITS) for communicating with communication apparatuses placed in vehicles other than the vehicle C and by the roads and a communication apparatus relating to electronic toll collection (ETC). The digital communication apparatus 402 includes a global positioning system (GPS) receiver and a television receiver, for example. The GPS receiver receives GPS signals transmitted from not-illustrated GPS satellites. In other words, the GPS receiver communicates with the GPS satellites. The television receiver receives radio waves for television transmitted from a television tower (radio wave tower for television). In other words, the television receiver communicates with a television tower (a radio wave transmission apparatus provided in the television tower). For example, the radio waves for television received by the television receiver are radio waves for 1seg broadcast, for example. The external server, the communication apparatuses placed in a vehicle other than the vehicle C and by the roads, the GPS satellites, and the television tower are included in the communication target outside of the vehicle C.

As illustrated in FIG. 2, the onboard relay apparatus 1 is provided with a housing (case) 10 and a circuit board 100 provided inside the housing 10 and is attached to the roof R. The housing 10 is a box-like body with a rectangular parallelepiped shape, for example. The housing 10 is made of a resin, for example. The upper side of the diagram in FIG. 2 represents the roof R side of the vehicle C, i.e., the upper side of the vehicle C. The lower side of the diagram in FIG. 2 represents the floor F side of the vehicle C, i.e., the lower side of the vehicle C. The vertical direction of the diagram in FIG. 2 represents the vertical direction of the vehicle C. The left side of the diagram in FIG. 2 represents the front side of the vehicle C, and the right side of the diagram in FIG. 2 represents the rear side of the vehicle C. The left-and-right direction of the diagram in FIG. 2 represents the front-and-back direction of the vehicle C. The front-and-back direction of the diagram in FIG. 2 represents the left-and-right direction of the vehicle C. This is the same for FIGS. 4, 5, 6, 7, 9, 10, and 11 described below.

The circuit board 100 has a rectangular shape, for example, and extends in a direction (the front-and-back direction and the left-and-right direction of the vehicle C) orthogonal to the vertical direction of the vehicle C. The circuit board 100 may be a single circuit board or may be a multilayer circuit board, for example. The circuit board 100 is provided with a noise suppression member 13 on the inside, in other words, between the roof R side surface and the floor F side surface. The noise suppression member 13, for example, is an electromagnetic shielding member, such as a sheet made of magnetic metal, a sheet made of resin containing magnetic metal, or the like. The noise suppression member 13, for example, has a rectangular shape that extends in a direction orthogonal to the vertical direction of the vehicle C. The noise suppression member 13 suppresses the propagation of noise to a first circuit 11 and a second circuit 12 described below. Hereinafter, the surface of the circuit board 100 on the roof R side is referred to as the upper surface, and the surface of the circuit board 100 on the floor F side is referred to as the lower surface.

The circuit board 100 includes a main line connector 6 connected to the power supply apparatus 5 and the relay device 2 via a power line and a communication line provided in (routed through) the pillar P of the vehicle C. The circuit board 100 includes a branch line connector connected to the onboard load 4 via a power line and a communication line provided on (routed through) the roof R. The branch line connector includes a first branch line connector 70 connected to the outside-vehicle communication apparatus 40 and a second branch line connector 71 connected to the onboard load 4 other than the outside-vehicle communication apparatus 40. The first branch line connector 70 is provided on the upper surface of the circuit board 100, and the main line connector 6 and the second branch line connector 71 are provided on the lower surface of the circuit board 100.

The first branch line connector 70 is attached to a side portion of the upper surface of the circuit board 100. The first branch line connector 70 is attached to a side portion at the rear side of the circuit board 100 in FIG. 2. A portion of the first branch line connector 70 is exposed to the outside from the housing 10 via an opening provided in the side surface at the rear side of the housing 10. In other words, the first branch line connector 70 is provided on (attached to) the side surface at the rear side of the housing 10 (onboard relay apparatus 1). A power line and a communication line (wire harness) provided on the roof R and connected to the outside-vehicle communication apparatus 40 are connected at a portion of the first branch line connector 70.

The first branch line connector 70 may be attached to the side portion at the front side, the right side, or the left side of the circuit board 100. In other words, the first branch line connector 70 may be provided on the side surface at the front side, the right side, or the left side of the housing 10. A plurality of the first branch line connectors 70 may be attached. Each first branch line connector 70 may be attached to a different side portion on the upper surface of the circuit board 100. For example, one first branch line connector 70 may be attached to the side portion (side surface at the front side of the housing 10) at the front side of the circuit board 100 and one first branch line connector 70 may be attached to the side portion (side surface at the rear side of the housing 10) at the rear side of the circuit board 100.

The first branch line connector 70 is connected to the first circuit 11 formed on the upper surface of the circuit board 100. The first circuit 11 includes an electronic component 11a, such as a transistor, a diode, a capacitor, an integrated circuit (IC), or the like.

The main line connector 6 and the second branch line connector 71 are attached to a side portion of the lower surface of the circuit board 100. In FIG. 2, the main line connector 6 and the second branch line connector 71 are disposed side by side in the left-and-right direction (front-and-back direction in the diagram of FIG. 2) of the vehicle C and are attached to the side portion at the front side of the circuit board 100. A portion of the main line connector 6 and a portion of the second branch line connector 71 are exposed to the outside from the housing 10 via an opening provided in the side surface at the front side of the housing 10. In other words, the main line connector 6 and the second branch line connector 71 are provided on (attached to) the side surface at the front side of the housing 10 (onboard relay apparatus 1). A power line and a communication line provided on the pillar P of the vehicle C and connected to the relay device 2 and the power supply apparatus 5 are connected at a portion of the main line connector 6. A power line and a communication line provided on the roof R and connected to the onboard load 4 different from the outside-vehicle communication apparatus 40 (onboard load 4 other than the outside-vehicle communication apparatus 40) are connected at a portion of the second branch line connector 71.

The main line connector 6 and the second branch line connector 71 may not be disposed side by side at the same side portion of the circuit board 100 and may be attached at different side portions of the circuit board 100. In other words, the main line connector 6 and the second branch line connector 71 may be provided on different side surfaces of the housing 10. For example, the main line connector 6 may be attached to the side portion (side surface at the front side of the housing 10) at the front side of the circuit board 100 and the second branch line connector 71 may be attached to the side portion (side surface at the rear side of the housing 10) at the rear side of the circuit board 100. A plurality of the main line connectors 6 and a plurality of the second branch line connectors 71 may be attached. Each main line connector 6 may be attached to a different side portion (different side surface of the housing 10) on the lower surface of the circuit board 100. Each second branch line connector 71 may be attached to a different side portion (different side surface of the housing 10) on the lower surface of the circuit board 100.

The main line connector 6 and the second branch line connector 71 are connected to the second circuit 12 formed on the lower surface of the circuit board 100. The second circuit 12 includes an electronic component 12a, such as a transistor, a diode, a capacitor, a memory element, an IC, or the like. The first circuit 11 and the second circuit 12 are electrically connected via a not-illustrated through hole provided in the circuit board 100, for example. The first circuit 11 (electronic component 11a) and the second circuit 12 (electronic component 12a) form each functional block of the onboard relay apparatus 1 described below.

The map lamp 41 is attached to the outer surface on the floor F side of the housing 10. The map lamp 41 is provided with a plurality of lamps 410 (two in FIG. 2) and a switch 411 that outputs a signal indicating for the lamps 410 to turn on or turn off. The lamps 410 are LED lamps, for example. The map lamp 41 is connected to the above-described portion of the second branch line connector 71 via a power line and a communication line. The map lamp 41 may be connected to the second circuit 12 via a power line and a communication line via a not-illustrated hole running through the housing 10 from inside to outside, for example.

The switch 411 of the map lamp 41 is capable of switching between three states, turn on, turn off, and detect open/closed. In a case where the switch 411 is switched from the turn off state or the detect open/closed state to the turn on state, the switch 411 outputs a signal indicating for the lamps 410 to turn on. In a case where the switch 411 is switched from the turn on state or the detect open/closed state to the turn off state, the switch 411 outputs a signal indicating for the lamps 410 to turn off. A case where the switch 411 is in the detect open/closed state will be described below.

The map lamp 41 is included in the meaning of a lamp device in the claims. The lamp device is not limited to the map lamp 41 and also includes a room lamp, for example. The onboard relay apparatus 1 is provided with the map lamp 41, or in other words, the onboard relay apparatus 1 and the map lamp 41 are integrally formed. Thus, the limited area of the roof R can be effectively used. Because the communication line and the power line connecting the onboard relay apparatus 1 and the map lamp 41 are provided on the roof R, an increase to the number of communication lines and power lines provided on the roof R can be suppressed.

Figure 3:
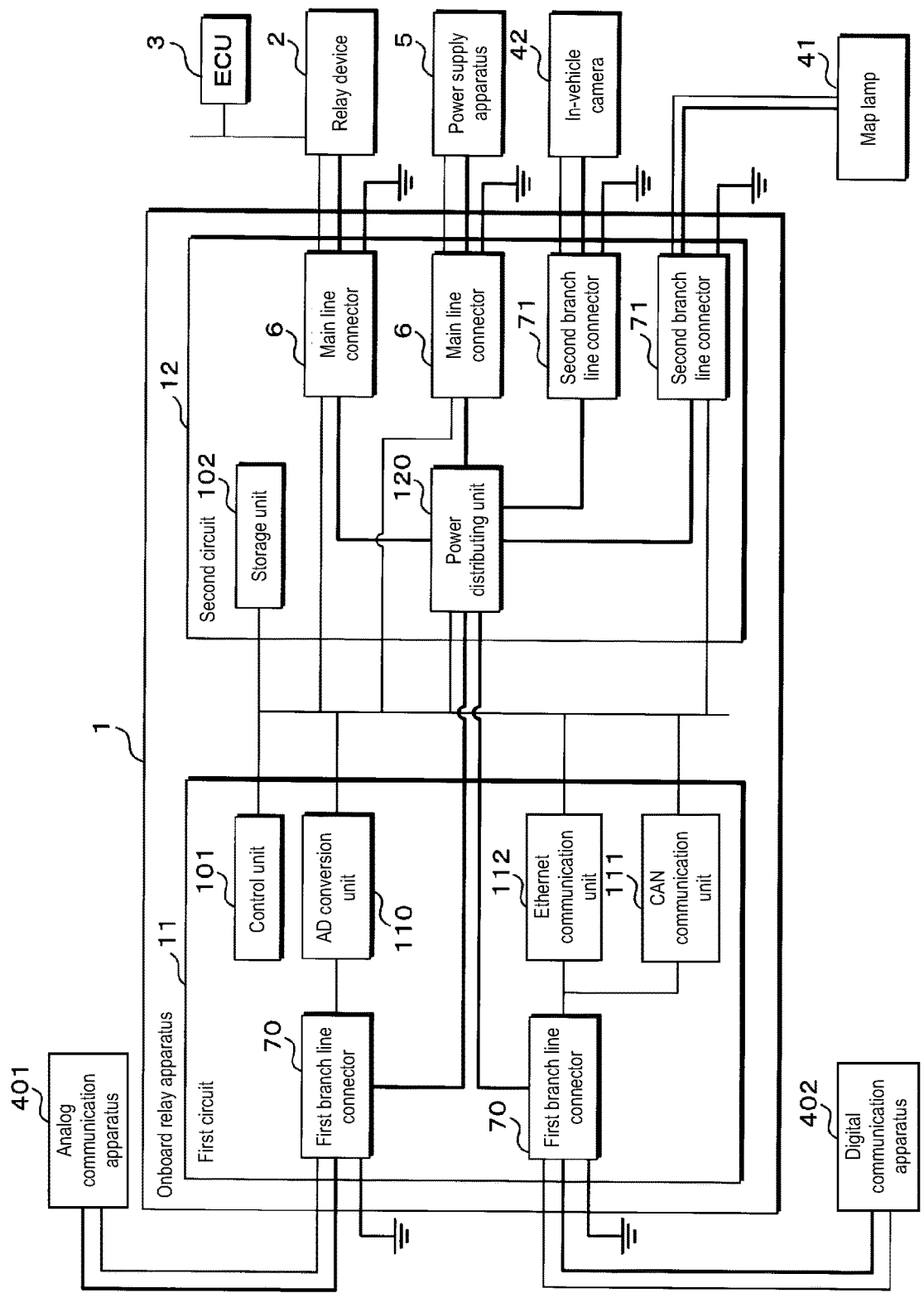
FIG. 3 is a block diagram illustrating in a plan view the functional blocks of the onboard relay apparatus including a first circuit and a second circuit.

FIG. 3 is a block diagram illustrating in a plan view the functional blocks of the onboard relay apparatus 1 including the first circuit 11 and the second circuit 12. The onboard relay apparatus 1 is provided with a control unit 101 and a storage unit 102. In FIG. 3, the control unit 101 is included in the first circuit 11. In other words, the control unit 101 is constituted by the electronic component 11a. The control unit 101 may be included in the second circuit 12 (may be constituted by the electronic component 12a). In FIG. 3, the storage unit 102 is included in the second circuit 12. The storage unit 102 may be included in the first circuit 11. Both the control unit 101 and the storage unit 102 may be included in either the first circuit 11 or the second circuit 12.

The storage unit 102 is constituted by a volatile memory element such as RAM or a non-volatile memory element, such as ROM, EEPROM, flash memory, or the like. The control program is stored in advance in the storage unit 102. The control program stored in the storage unit 102 may be a control program read out from a storage medium readable by the onboard relay apparatus 1. Also, the control program may be a control program downloaded from a non-illustrated external computer connected to a non-illustrated communication network and stored in the storage unit 102.

The control unit 101 is constituted by a CPU, an MPU, or the like and executes various types of control processing and calculation processing by reading out and executing a control program and data stored in advance in the storage unit 102. By executing the control program stored in the storage unit 102, the control unit 101 controls the supply or cut off of supply of power supplied from the power supply apparatus 5 via the power line provided on the pillar P of the vehicle C and distributed to the onboard loads 4 via the power lines provided on the roof R. By executing the control program stored in the storage unit 102, the control unit 101 controls the relay of communication between the onboard loads 4 and the relay device 2. By executing the control program stored in the storage unit 102, the control unit 101 functions as a sleep and wakeup unit that stops relay (communication) when the vehicle C is not in use (when the engine of the vehicle C is stopped) and starts relay (communication) when the vehicle C is in use (when the engine of the vehicle C is activate). The effects of dark current, for example, power consumption of the battery of the vehicle C, can be suppressed. By executing the control program stored in the storage unit 102, the control unit 101 functions as a lamp control unit that controls turning on and turning off the lamps 410 in accordance with signals indicating for the lamps 410 to turn on or turn off output from the switch 411.

By executing the control program stored in the storage unit 102, the control unit 101 may function as a security unit that executes processing relating to the security of the communication (outside-vehicle communication) with the not-illustrated communication target outside of the vehicle C. The processing relating to the security of the outside-vehicle communication includes, for example, authentication of the communication target outside of the vehicle C, for example an external server, and processing for encrypting and decrypting communication data. In the authentication of the communication target outside of the vehicle C, the control unit 101 determines whether or not an identification (ID) number of the communication target outside the vehicle C stored in the storage unit 102 in advance and an ID number transmitted from the communication target outside of the vehicle C match. In a case where the ID numbers match, the authentication of the communication target outside of the vehicle C is successful. The processing relating to security of the outside-vehicle communication may be executed by the relay device 2, for example.

The onboard relay apparatus 1 is provided with a plurality (two in FIG. 3) of the first branch line connectors 70 described above. Each first branch line connector 70 is connected to (included in) the first circuit 11. Each first branch line connector 70 is connected to a ground. In other words, each first branch line connector 70 is grounded. The first branch line connectors 70 may be connected to a not-illustrated common ground of the vehicle C, for example.

A first first branch line connector 70 is connected to the analog communication apparatus 401 via a communication line and a power line, for example via a wire harness, provided on the roof R. Also, the first branch line connector 70 is electrically connected to an analog-to-digital (AD) conversion unit 110 provided in the onboard relay apparatus 1. The AD conversion unit 110 is included in the first circuit 11. Specifically, the first circuit 11 includes an analog signal circuit relating to transmitting an analog signal. The AD conversion unit 110 is included in the analog signal circuit. The AD conversion unit 110 converts an analog signal received from the analog communication apparatus 401 via the first first branch line connector 70 to a digital signal and outputs the signal.

For example, the analog communication apparatus 401 (radio receiver) receives the radio waves and outputs a signal (radio signal) relating to the received radio waves. The control unit 101 acquires the radio signal output from the radio receiver. Specifically, the radio signal output from the radio receiver is transmitted to the AD conversion unit 110, and the analog signal is converted to a digital signal at the AD conversion unit 110. The control unit 101 acquires the radio signal converted to a digital signal. The control unit 101 relays (outputs) the acquired radio signal to a CAN communication unit 111 or an Ethernet communication unit 112 described below and the relay device 2 via the first main line connector 6 described below. The relay device 2 acquires the radio signal output from the control unit 101 (onboard relay apparatus 1) and relays (outputs) the acquired radio signal to the onboard ECU 3 relating to radio. The onboard ECU 3 relating to radio acquires the radio signal output from the relay device 2 and outputs the acquired radio signal to a not-illustrated speaker provided inside the vehicle C. Radio audio is output from the speaker.

The onboard relay apparatus 1 may be provided with an analog signal multiplexing unit that multiplexes (combines) a plurality of analog signals. The analog signal multiplexing unit, for example, is electrically connected to the first first branch line connector 70 and the AD conversion unit 110. The analog signal multiplexing unit multiplexes a plurality of analog signals received from the analog communication apparatus 401 via the first first branch line connector 70 and outputs a multiplexed analog signal to the AD conversion unit 110. The AD conversion unit 110 acquires the multiplexed analog signal, converts the acquired analog signal to a digital signal, and outputs the signal. The analog signal multiplexing unit is included in the analog signal circuit (first circuit 11). The AD conversion unit 110 may perform multiplexing on the analog signals.

The second first branch line connector 70 is connected to the digital communication apparatus 402 via a communication line and a power line, for example via a wire harness, provided on the roof R. Also, the CAN communication unit 111 provided in the onboard relay apparatus 1 and the Ethernet communication unit 112 are electrically connected. The CAN communication unit 111 and the Ethernet communication unit 112 are included in the first circuit 11.

The Ethernet communication unit 112 includes an I/O interface compatible with an Ethernet communication protocol. The Ethernet communication unit 112 communicates with the digital communication apparatus 402 using an Ethernet communication protocol via the second first branch line connector 70. The Ethernet communication unit 112 communicates with the onboard load 4 other than the outside-vehicle communication apparatus 40 using an Ethernet communication protocol via the second branch line connector 71. The Ethernet communication unit 112 communicates with the relay device 2 and the power supply apparatus 5 using an Ethernet communication protocol via the main line connector 6. The Ethernet communication unit 112 performs a protocol conversion from a communication protocol other than Ethernet, such as CAN, to Ethernet. For example, the Ethernet communication unit 112 converts the program or data received from the digital communication apparatus 402 via the second first branch line connector 70 into an Ethernet communication protocol and outputs the converted program or data. The Ethernet communication unit 112 includes, for example, an Ethernet circuit, which is a circuit relating to communication using Ethernet, and an Ethernet switch. The control unit 101 communicates with the onboard load 4 other than the outside-vehicle communication apparatus 40, the digital communication apparatus 402, the relay device 2, and the power supply apparatus 5 using an Ethernet communication protocol via the Ethernet communication unit 112.

The CAN communication unit 111 includes an I/O interface compatible with a CAN communication protocol. The CAN communication unit 111 communicates with the digital communication apparatus 402 using a CAN communication protocol via the second first branch line connector 70. The CAN communication unit 111 communicates with the onboard load 4 other than the outside-vehicle communication apparatus 40 using a CAN communication protocol via the second branch line connector. The CAN communication unit 111 communicates with the relay device 2 and the power supply apparatus 5 using a CAN communication protocol via the main line connector 6. The CAN communication unit 111 performs a protocol conversion from a communication protocol other than CAN, such as Ethernet, to CAN. For example, the CAN communication unit 111 converts the program or data received from the digital communication apparatus 402 via the second first branch line connector into a CAN communication protocol and outputs the converted program or data. The CAN communication unit 111, for example, includes a circuit (CAN circuit) relating to communication using CAN. The control unit 101 communicates with the onboard load 4 other than the outside-vehicle communication apparatus 40, the digital communication apparatus 402, the relay device 2, and the power supply apparatus 5 using a CAN communication protocol via the CAN communication unit 111.

For example, the digital communication apparatus 402 (TCU) communicates with a computer (external server) such as a server connected to an outside-vehicle network such as the Internet, a public network, or the like via the outside-vehicle network. The digital communication apparatus 402 acquires an update program of the onboard ECU 3 from the external server and outputs the acquired update program to the onboard relay apparatus 1. The control unit 101 of the onboard relay apparatus 1 acquires the update program output from the digital communication apparatus 402 via the CAN communication unit 111 or the Ethernet communication unit 112 and the second first branch line connector 70. The control unit 101 relays (outputs) the acquired update program to the CAN communication unit 111 or the Ethernet communication unit 112 and the relay device 2 via the first main line connector 6. The relay device 2 acquires the update program output from the control unit 101 (onboard relay apparatus 1) and relays (outputs) the acquired update program to the onboard ECU 3 which is the update target.

A communication protocol other than CAN and Ethernet may be used for communication between the control unit 101, the onboard load 4, the relay device 2, and the power supply apparatus 5. In other words, the communication unit (communication interface) compatible with communication using a communication protocol other than CAN and Ethernet may be included in the first circuit 11. The control unit 101 communicates with the onboard load 4, the relay device 2, and the power supply apparatus 5 via the communication unit. Examples of communication protocols other than CAN and Ethernet include the CAN with Flexible Data Rate (CAN FD), the low-voltage differential signaling (LVDS), and the Local Interconnect Network (LIN) communication protocols, for example.

The onboard relay apparatus 1 is provided with a plurality (two in FIG. 3) of the main line connectors 6 and a plurality (two in FIG. 3) of the second branch line connectors 71. Each main line connector 6 and each second branch line connector 71 is connected to (included in) the second circuit 12. Each main line connector 6 and each second branch line connector 71 is connected to a ground. In other words, the main line connectors 6 and the second branch line connectors 71 are grounded. Each main line connector 6 and each second branch line connector 71 may be connected to a common not-illustrated ground of the vehicle C, for example.

The first main line connector 6 is connected to the relay device 2 via a communication line and a power line, for example via a wire harness, provided on the pillar P of the vehicle C. The control unit 101 communicates with the CAN communication unit 111 or the Ethernet communication unit 112 and the relay device 2 via the first main line connector 6. The control unit 101 acquires a signal (program or data) relating to the communication of the onboard ECU 3, for example for the onboard ECU 3 to control a predetermined onboard load 4 (the onboard load 4 which is the control target), relayed from the relay device 2. The first main line connector 6 (onboard relay apparatus 1) and the relay device 2 may not be connected by a power line. In this case, the relay device 2 is connected to the power supply apparatus 5 by a power line, for example.

The second main line connector 6 is connected to the power supply apparatus 5 via a communication line and a power line, for example via a wire harness, provided on the pillar P of the vehicle C. Also, the second main line connector 6 is electrically connected to a power distributing unit 120 that distributes the power. The power distributing unit 120, for example, includes a distributing circuit or distributing device for distributing the power supplied from the power supply apparatus 5. The power distributing unit 120 is electrically connected to each first branch line connector 70 and each second branch line connector 71 and distributes the power supplied from the power supply apparatus 5 via the second main line connector 6 to the onboard loads 4 via the first branch line connectors 70 and the second branch line connectors 71. The power distributing unit 120 is also electrically connected to the first main line connector 6 and distributes the power supplied from the power supply apparatus 5 to the relay device 2 via the first main line connector 6. The power is distributed by the power distributing unit 120 on the basis of a preset (designed) ratio.

The power distributing unit 120 further includes a relay (relay switch) for supplying and cutting off the distributed power, in other words, supplying and cutting off the supply of power distributed to the onboard loads 4 and the relay device 2. Further provided is a fuse that, when an overcurrent occurs in the first circuit 11 or the second circuit 12, cuts off the current and protects the first circuit 11, the second circuit 12, and the power line (wire harness) connected to the first circuit 11 and the second circuit 12. Switching of the relay of the power distributing unit 120 is controlled by the control unit 101. In other words, the control unit 101 causes the power distributing unit 120 to switch the relay and controls the supply and cutting off of the distributed power. For example, in a case where the fuse described above is activated (an overcurrent has occurred), the control unit 101 may output a signal indicating that an overcurrent occurred to the power supply apparatus 5.

The fuse is preferably a semiconductor fuse. This is because a semiconductor fuse also functions as a semiconductor relay, allowing it to also function as the relay. By using a semiconductor fuse (semiconductor relay), an increase in the number of electronic components 12a (number of components in the onboard relay apparatus 1) can be suppressed. A semiconductor fuse (semiconductor relay) does not need to be replaced. For example, the control unit 101 is connected to the semiconductor fuse (semiconductor relay) via a not-illustrated wire. In a case where an overcurrent occurs, the control unit 101 cuts off the current to the semiconductor fuse. After the current has been cut off and the current has returned to normal, the control unit 101 restarts the flow of current to the semiconductor fuse (cancels the cutting off of current). The relay is not limited to a semiconductor relay and may be a mechanical relay, for example. In a case where a mechanical relay is used, a mechanical fuse is included in the power distributing unit 120, for example. A mechanical fuse needs to be replaced and is disposed at a position where it can be easily replaced.

Each second branch line connector 71 is connected to the onboard load 4 other than the outside-vehicle communication apparatus 40 via a communication line and a power line, for example via a wire harness. The first second branch line connector 71 is connected to the map lamp 41 via a communication line and a power line.

An example in which the switch 411 of the map lamp 41 is in the detect open/closed state will now be described. In the detect open/closed state, the open/closed state of a not-illustrated door of the vehicle C is detected and the lamps 410 of the map lamp 41 are turned on or turned off (depending on the open/closed state of the door). The door of the vehicle C is provided with a sensor that detects whether the door is open or closed, for example. When the door is in the open state, the sensor outputs a signal (open signal) indicating that the door is in the open state to the onboard ECU 3 relating to the map lamp 41. The onboard ECU 3 relating to the map lamp 41 acquires the open signal output from the sensor and outputs a signal (turn on signal) for turning on the lamps 410. The relay device 2 acquires the turn on signal output from the onboard ECU 3 relating to the map lamp 41 and relays (outputs) the acquired turn on signal to the control unit 101 of the onboard relay apparatus 1. The control unit 101 acquires the turn on signal output from the relay device 2 via the main line connector 6 and the CAN communication unit 111 or the Ethernet communication unit 112. The control unit 101 turns on the lamps 410 of the map lamp 41. Specifically, the control unit 101 causes the power distributing unit 120 to switch the relay so that power is supplied to the map lamp 41 (second branch line connector 71 connected to the map lamp 41). The lamps 410 are turned on by the supplied power.

When the door is in the closed state, the sensor outputs a signal (closed signal) indicating that the door is in the closed state to the onboard ECU 3 relating to the map lamp 41. The onboard ECU 3 relating to the map lamp 41 acquires the closed signal output from the sensor and outputs a signal (turn off signal) for turning off the lamps 410. The relay device 2 acquires the turn off signal output from the onboard ECU 3 relating to the map lamp 41 and relays (outputs) the acquired turn off signal to the control unit 101 of the onboard relay apparatus 1. The control unit 101 acquires the turn off signal output from the relay device 2 via the main line connector 6 and the CAN communication unit 111 or the Ethernet communication unit 112. The control unit 101 turns off the lamps 410 of the map lamp 41. Specifically, the control unit 101 causes the power distributing unit 120 to switch the relay so that the supply of power to the map lamp 41 (second branch line connector 71 connected to the map lamp 41) is stopped (cut off). With the supply of power stopped, the lamps 410 turn off.

In a case where the switch 411 is switched from the turn off state or the detect open/closed state to the turn on state, the switch 411 outputs a signal indicating for the lamps 410 to turn on. The control unit 101 acquires the output signal indicating for the lamps 410 to turn on via the second branch line connector 71 and turns on the lamps 410 of the map lamp 41 as described above.

In a case where the switch 411 is switched from the turn on state or the detect open/closed state to the turn off state, the switch 411 outputs a signal indicating for the lamps 410 to turn off. The control unit 101 acquires the output signal indicating for the lamps 410 to turn off via the second branch line connector 71 and turns off the lamps 410 of the map lamp 41 as described above. The map lamp 41 may not be connected to the first second branch line connector 71 via a communication line and a power line. The map lamp 41 may be connected to the second circuit by a communication line and a power line via a hole running through the housing 10 as described above. In this case, the control unit 101 acquires a signal indicating for the lamps 410 to turn on and a signal indicating for the lamps 410 to turn off via the communication line.

The map lamp 41 and the onboard relay apparatus 1 are integrally formed, but may be installed in the vehicle C as separate apparatuses. In addition to the map lamp 41 or instead of the map lamp 41, a sun visor provided with a lamp and a vanity mirror may be connected to the second branch line connector 71, for example. The sun visor is attached to the roof R above the passenger seat of the vehicle C, for example. A cover is attached to the vanity mirror of the sun visor. The cover functions as a switch that outputs a signal indicating for the lamp to turn on and turn off. When in the open state, the cover outputs a signal indicating for the lamp to turn on to the control unit 101. When in the closed state, the cover outputs a signal indicating for the lamp to turn off to the control unit 101. In other words, the cover outputs a signal indicating for the lamp to turn on and turn off depending on the open/closed state. The sun visor is included in the meaning of a lamp device in the claims.

The in-vehicle camera 42, an example of the onboard load 4 other than the outside-vehicle communication apparatus 40, is connected to the second second branch line connector 71. The in-vehicle camera 42 is a driver monitor camera, for example. The onboard ECU 3 relating to the in-vehicle camera 42, for example, outputs a signal (image capture start signal) for starting image capture to the in-vehicle camera 42 when the engine of the vehicle C is activated. The relay device 2 acquires the image capture start signal output from the onboard ECU 3 relating to the in-vehicle camera 42 and relays (outputs) the acquired image capture start signal to the control unit 101 of the onboard relay apparatus 1. The control unit 101 acquires the image capture start signal output from the relay device 2 via the main line connector 6 and the CAN communication unit 111 or the Ethernet communication unit 112. The control unit 101 relays (outputs) the acquired image capture start signal to the in-vehicle camera 42 via the second second branch line connector 71 and the CAN communication unit 111 or the Ethernet communication unit 112. The in-vehicle camera 42 starts image capture and outputs the data (image data) relating to the captured images (moving images or still images) to the control unit 101 of the onboard relay apparatus 1. The control unit 101 acquires the image data output from the in-vehicle camera 42 via the second second branch line connector 71 and the CAN communication unit 111 or the Ethernet communication unit 112. The control unit 101 relays (outputs) the acquired image data to the relay device 2 via the main line connector 6 and the CAN communication unit 111 or the Ethernet communication unit 112. The relay device 2 acquires the image data output from the onboard relay apparatus 1 and relays (outputs) the acquired image data to the onboard ECU 3 relating to the in-vehicle camera 42.

The onboard loads 4, for example, are connected to the onboard relay apparatus 1 (the first branch line connector 70 or the second branch line connector 71) via communication lines and power lines, for example via wire harnesses. At least one of the onboard loads 4 may be connect to the onboard relay apparatus 1 via a dedicated communication line and power line (dedicated line). A dedicated line is a so-called conductive line for serial communication and connects separately to the onboard load 4 and the onboard relay apparatus 1 (the first branch line connector or the second branch line connector). For example, the map lamp 41 may be connected to the onboard relay apparatus 1 (the second branch line connector 71 or the second circuit 12) via a dedicated line. For example, the in-vehicle camera 42 may be connected to the onboard relay apparatus 1 (second branch line connector 71) via a dedicated line.

Because the noise suppression member 13 is provided inside the circuit board 100, noise propagating from the second circuit 12 to the first circuit 11 and noise propagating from the first circuit 11 to the second circuit 12 is suppressed. Thus, driving the onboard load 4, for example, communication of the outside-vehicle communication apparatus 40, can be stably performed.

For the connection between the main line connector 6 and the relay device 2 and the power supply apparatus 5 and the connection between the branch line connector (the first branch line connector 70 or the second branch line connector 71) and the onboard load 4, Power of Ethernet/Power over Ethernet (PoE) may be used for both supplying power and communicating using a single cable (wire).

The onboard relay apparatus 1 is connected to the plurality of onboard loads 4 provided on the roof R via power lines and communication lines provided on the roof R. Also, the relay device 2 (second onboard relay apparatus) and the power supply apparatus 5 provided in an area other than the roof R are connected via a power line and a communication line provided on the pillar P of the vehicle C. The onboard relay apparatus 1 supplies and cuts off the power supplied from the power supply apparatus 5 via a power supply line provided on the pillar P and distributed to the onboard loads 4 via power supply lines provided on the roof R. The onboard relay apparatus 1 relays communication between the onboard loads 4 and the relay device 2. The onboard loads 4 and the power supply apparatus 5 and the relay device 2 are connected via the onboard relay apparatus 1. In other words, the onboard loads 4 and the power supply apparatus 5 are not individually connected. The onboard loads 4 and the relay device 2 are not individually connected. Thus, an increase to the number of communication lines and power lines provided on the pillar P of the vehicle C can be suppressed.

The circuit board 100 is provided with the first circuit 11 on the upper surface (the roof R side surface) and the second circuit 12 on the lower surface (the floor F side surface). In other words, both surfaces of the circuit board 100 are used. Thus, the onboard relay apparatus 1 can be made compact. In other words, the area required for attaching the onboard relay apparatus 1 is decreased, and the limited area of the roof R can be effectively used.

Many outside-vehicle communication apparatuses 40 are provided on the upper portion of the roof R. Because the first branch line connector 70 is provided on the roof R side surface of the circuit board 100, communication lines and power lines for connecting the onboard relay apparatus 1 and the outside-vehicle communication apparatuses 40 can be easily disposed on (routed through) the roof R. The length of the communication lines and the power lines for connecting the onboard relay apparatus 1 and the outside-vehicle communication apparatuses 40 can be reduced.

Typically, heat insulation material is provided on the roof R making it difficult for heat generated at the onboard relay apparatus 1 (the first circuit 11 and the second circuit 12) to dissipate outside of the vehicle C. Because the second circuit 12 includes a relay, a fuse, and the like, the amount of heat generated at the second circuit 12 is increased. However, the second circuit 12 is formed on the floor F side surface of the vehicle C, in other words the cabin side surface of the vehicle C, in the circuit board 100. This allows the heat generated at the second circuit 12 to be effectively dissipated to the cabin of the vehicle C. In other words, it is difficult for heat to build up inside the onboard relay apparatus 1 (housing 10).

Second Embodiment

Figure 4:
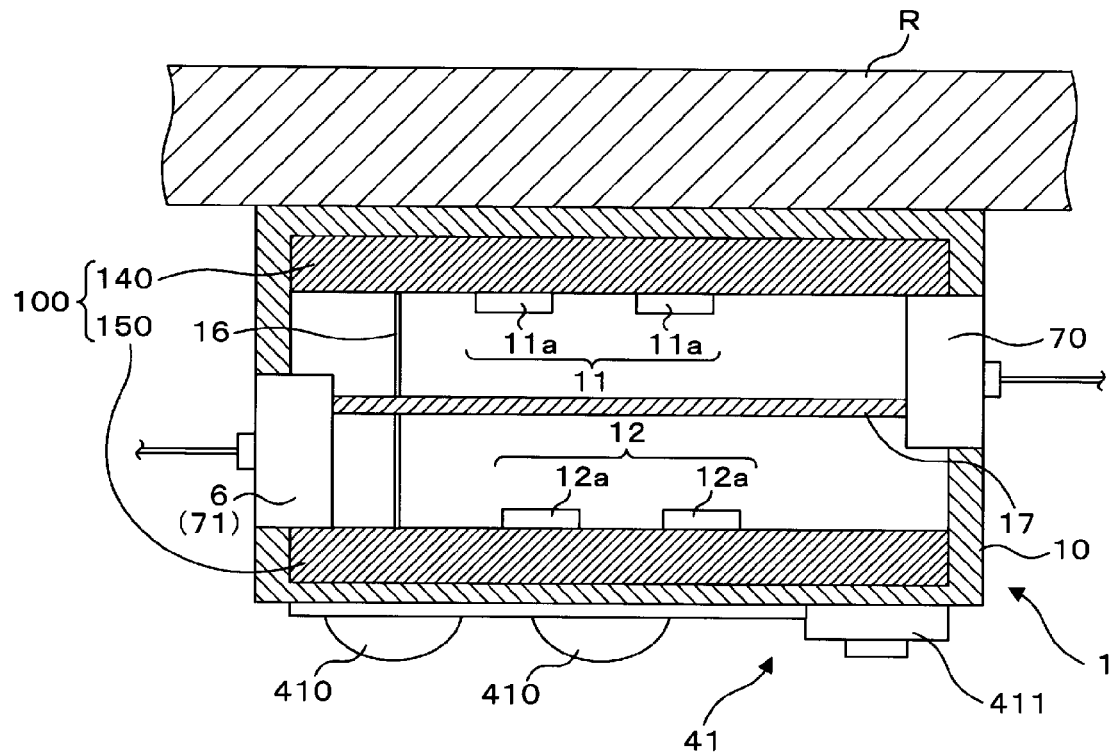
FIG. 4 is a schematic cross-sectional view illustrating the configuration of an onboard relay apparatus according to a second embodiment.

FIG. 4 is a schematic cross-sectional view illustrating the configuration of the onboard relay apparatus 1 according to the second embodiment. For the configuration according to the second embodiment, components similar to that in the first embodiment are given the same reference sign and detailed descriptions thereof are omitted. The onboard relay apparatus 1 of the second embodiment is attached to the roof R of the vehicle C.

In the onboard relay apparatus 1 of the second embodiment, the circuit board 100 includes a first substrate 140 disposed on the roof R side (upper side) inside the housing 10 and a second substrate 150 disposed on the floor F side (lower side) inside the housing 10. The first substrate 140 and the second substrate 150 may be a single circuit board or may be a multilayer circuit board, for example. The first substrate 140 and the second substrate 150 are disposed aligned and facing one another in the vertical direction of the vehicle C.

The first substrate 140, for example, is attached to the inner surface on the roof R side of the housing 10. The first circuit 11 is formed on the floor F side surface (lower surface of the first substrate 140) of the first substrate 140. The first branch line connector 70 is attached to the side portion of the lower surface of the first substrate 140. The first branch line connector 70 is connected to the first circuit 11. In FIG. 4, the first branch line connector 70 is attached to the side portion at the rear side of the lower surface of the first substrate 140. A portion of the first branch line connector 70 is exposed to the outside from the housing 10 via an opening provided in the side surface at the rear side of the housing 10. In other words, the first branch line connector 70 is provided on (attached to) the side surface at the rear side of the housing 10 (onboard relay apparatus 1). A power line and a communication line provided on the roof R and connected to the outside-vehicle communication apparatus 40 are connected at a portion of the first branch line connector 70.

The second substrate 150, for example, is attached to the inner surface on the floor F side of the housing 10. The second circuit 12 is formed on the roof R side surface (upper surface of the second substrate 150) of the second substrate 150. The second circuit 12 is connected to the first circuit 11 via a wire 16 including a communication line and a power line. In other words, the first substrate 140 and the second substrate 150 are connected via the wire 16. The main line connector 6 and the second branch line connector 71 are attached to the side portion of the lower surface of the second substrate 150. The main line connector 6 and the second branch line connector 71 are each connected to the second circuit 12. In FIG. 4, the main line connector 6 and the second branch line connector 71 are disposed side by side in the left-and-right direction (front-and-back direction in the diagram of FIG. 4) of the vehicle C and are attached to the side portion at the front side of the second substrate 150. A portion of the main line connector 6 and a portion of the second branch line connector 71 are exposed to the outside from the housing 10 via an opening provided in the side surface at the front side of the housing 10. In other words, the main line connector 6 and the second branch line connector 71 are provided on (attached to) the side surface at the front side of the housing 10 (onboard relay apparatus 1). A power line and a communication line provided on the pillar P of the vehicle C and connected to the relay device 2 and the power supply apparatus 5 are connected at a portion of the main line connector 6. A power line and a communication line provided on the roof R and connected to the onboard load 4 other than the outside-vehicle communication apparatus 40 are connected at a portion of the second branch line connector 71.

The first substrate and the second substrate are disposed aligned in the vertical direction, allowing the onboard relay apparatus 1 to be made compact. In other words, the area required for attaching the onboard relay apparatus 1 is decreased, and the limited area of the roof R can be effectively used.

The first substrate 140 is provided with the first circuit 11 and the first branch line connector 70 on the surface facing the second substrate 150, in other words the floor F side surface of the first substrate 140. The second substrate 150 is provided with the second circuit 12, the main line connector 6, and the second branch line connector 71 on the surface facing the first substrate 140, in other words the roof R side surface of the second substrate 150. In FIG. 4, the first branch line connector 70 is provided on the side surface at the rear side of the housing 10. The main line connector 6 and the second branch line connector 71 is provided on the side surface at the front side of the housing 10. In other words, the first branch line connector 70 and the main line connector 6 and the second branch line connector 71 are each provided on different side surfaces of the housing 10 and overlap in the thickness direction of the onboard relay apparatus 1 (housing 10). In other words, the main line connector 6 and the branch line connectors 7 do not overlap in a front view of the onboard relay apparatus 1. Because they overlap in the thickness direction, the width of the side surfaces of the onboard relay apparatus 1 can be reduced. In other words, the height of the side surfaces of the onboard relay apparatus 1 can be reduced, and the thickness of the onboard relay apparatus 1 can be reduced. As long as the first branch line connector 70 and the main line connector 6 and the second branch line connector 71 overlap in the thickness direction, the arrangement of the first branch line connector 70 and the main line connector 6 and the second branch line connector 71 is not limited to the arrangement described above.

The onboard relay apparatus 1 is provided with a noise suppression member 17 inside the housing 10. The noise suppression member 17 is provided between the first substrate 140 and the second substrate 150, in other words between the first circuit 11 and the second circuit 12. The noise suppression member 17, for example, is an electromagnetic shielding member, such as a sheet made of magnetic metal, a sheet made of resin containing magnetic metal, or the like. The noise suppression member 17, for example, has a rectangular shape that extends in a direction orthogonal to the vertical direction of the vehicle C. The noise suppression member 17 effectively suppresses noise propagating from the second circuit 12 to the first circuit 11 and noise propagating from the first circuit 11 to the second circuit 12. Because noise propagation is suppressed, the onboard loads 4 connected to the onboard relay apparatus 1 can be stably driven. The noise suppression member 17 corresponds to a second noise suppression member in the claims.

The onboard relay apparatus 1 is provided with the map lamp 41. As in the first embodiment, the map lamp 41 is attached to the outer surface on the floor F side of the housing 10. The lamps 410 of the map lamp 41 may be mounted (connected) on the second circuit 12, for example. For example, the lamps 410 are LED lamps and are attached (mounted) to the floor F side surface of the second substrate 150 and electrically connected to the second circuit 12 via not-illustrated through holes provided in the second substrate 150. The lamps 410 are exposed to the outside of the housing 10 (cabin of the vehicle C) from openings provided on the floor F side of the housing 10. The switch 411 of the map lamp 41 is electrically connected to the second circuit 12 via a hole running through the housing 10 from inside to outside, for example. The switch 411 may be attached to the floor F side surface of the second substrate 150.

The onboard relay apparatus 1 and the map lamp 41 are integrally formed. Thus, the limited area of the roof R can be effectively used. Because the communication line and the power line connecting the onboard relay apparatus 1 and the map lamp 41 are provided on the roof R, an increase to the number of communication lines and power lines provided on the roof R can be suppressed.

As in the first embodiment, the onboard relay apparatus 1 is connected to the plurality of onboard loads 4 provided on the roof R via power lines and communication lines provided on the roof R. Also, the relay device 2 and the power supply apparatus 5 provided in an area other than the roof R are connected via a power line and a communication line provided on the pillar P of the vehicle C. The onboard relay apparatus 1 supplies and cuts off the power supplied from the power supply apparatus 5 via a power supply line provided on the pillar P and distributed to the onboard loads 4 via power supply lines provided on the roof R. The onboard relay apparatus 1 relays communication between the onboard loads 4 and the relay device 2. The onboard loads 4 and the relay device 2 and the power supply apparatus 5 are connected via the onboard relay apparatus 1. In other words, the onboard loads 4 and the relay device 2 and the power supply apparatus 5 are not individually connected. Thus, an increase to the number of communication lines and power lines provided on the pillar P of the vehicle C can be suppressed.

Because the first branch line connector 70 is provided on the first substrate 140, communication lines and power lines for connecting the onboard relay apparatus 1 and the outside-vehicle communication apparatuses 40 can be easily disposed on (routed through) the roof R. The length of the communication lines and the power lines for connecting the onboard relay apparatus 1 and the outside-vehicle communication apparatuses 40 can be reduced.

Typically, heat insulation material is provided on the roof R making it difficult for heat generated at the onboard relay apparatus 1 (the first circuit 11 and the second circuit 12) to dissipate outside of the vehicle C. Because the second circuit 12 includes a relay, a fuse, and the like, the amount of heat generated at the second circuit 12 is increased. However, the second circuit 12 is formed on the second substrate 150, in other words the cabin side of the vehicle C. This allows the heat generated at the second circuit 12 to be effectively dissipated to the cabin of the vehicle C. In other words, it is difficult for heat to build up inside the onboard relay apparatus 1 (housing 10).

Third Embodiment

Figure 5:
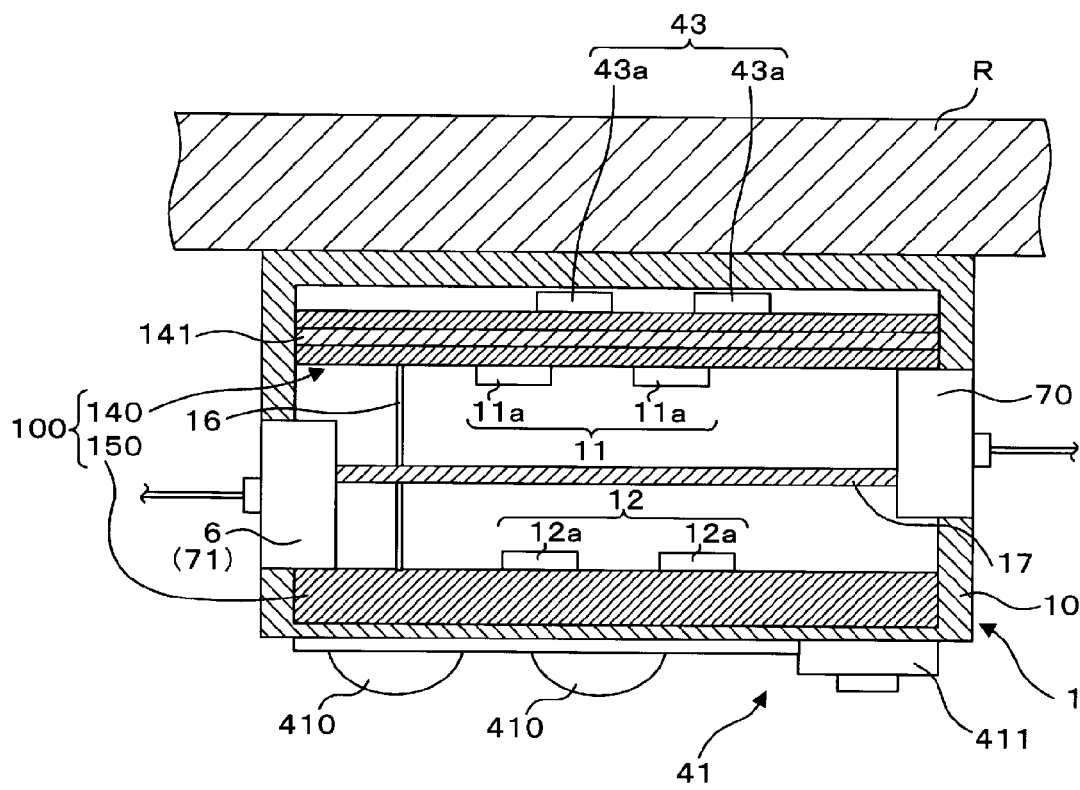
FIG. 5 is a schematic cross-sectional view illustrating the configuration of an onboard relay apparatus according to a third embodiment.

FIG. 5 is a schematic cross-sectional view illustrating the configuration of the onboard relay apparatus 1 according to the third embodiment. For the configuration according to the third embodiment, components similar to that in the second embodiment are given the same reference sign and detailed descriptions thereof are omitted. The onboard relay apparatus 1 of the third embodiment is attached to the roof R of the vehicle C.

As with the onboard relay apparatus 1 of the second embodiment, the onboard relay apparatus 1 according to the third embodiment is provided with the first substrate 140 provided inside the housing 10. In the onboard relay apparatus 1 of the third embodiment, the first substrate 140, for example, is formed in the space between the inner surfaces on the roof R side of the housing 10 inside the housing 10.

The outside-vehicle communication apparatus 40 is mounted on the roof R side surface of the first substrate 140, in other words, the surface opposite the surface facing the second substrate 150. In other words, the outside-vehicle communication apparatus 40 is built in the onboard relay apparatus 1. Specifically, an outside-vehicle communication circuit 43 for implementing the function of the outside-vehicle communication apparatus 40 is formed on the roof R side surface of the first substrate 140. The outside-vehicle communication circuit 43 includes a communication circuit (wireless circuit) for communicating with the communication target outside of the vehicle C and includes electronic components 43a, such as a transistor, a diode, a capacitor, an antenna, an IC, and the like that constituted the communication circuit. The outside-vehicle communication circuit 43 is electrically connected to the first circuit 11 formed on the floor F side surface of the first substrate 140 via a not-illustrated through hole provided in the first substrate 140.

The outside-vehicle communication circuit 43, for example, includes an antenna relating to (compatible with) LTE, 4G, or 5G communication and a wireless circuit relating to LTE, 4G, or 5G communication such as a digital processing circuit or the like and implements the function of a TCU (the outside-vehicle communication apparatus 40). The outside-vehicle communication circuit 43 (electronic components 43a), for example, may include an antenna for communication relating to ITS and an IC for communication relating to ITS and an antenna for communication relating to ETC and an IC for communication relating to ETC. The outside-vehicle communication circuit 43 may include an antenna relating to Wi-Fi communication and an IC relating to Wi-Fi communication and an antenna for receiving GPS signals and an IC for receiving GPS signals. Packages of various signals may be made at the outside-vehicle communication circuit 43. The onboard relay apparatus 1 is capable of communicating with the communication target outside of the vehicle C via the outside-vehicle communication circuit 43.

The outside-vehicle communication circuit 43 may include an amplifier relating to a television and an amplifier relating to a radio. There are limitations relating to the placement position of an antenna relating to a television and an antenna relating to a radio, for example. An antenna with limitations relating to the placement position of an antenna relating to a television and an antenna relating to a radio is attached on the outer side of the vehicle C on the roof R, for example, and is connected to the outside-vehicle communication circuit 43 via a communication line provided on the roof R. The communication line is connected to the outside-vehicle communication circuit 43 via a hole running through the housing 10, for example. The communication line may be connected to the first branch line connector 70 and may be connected to the outside-vehicle communication circuit 43 via a through hole provided in the first circuit 11 and the first substrate 140.

Because the outside-vehicle communication apparatus 40 is built in the onboard relay apparatus 1, an increase in the number of communication lines and power lines provided on the roof R for connecting the onboard relay apparatus 1 and the outside-vehicle communication apparatus 40 can be suppressed. The outside-vehicle communication apparatus 40 is mounted (the outside-vehicle communication circuit 43 is formed) on the roof R side surface of the first substrate 140, allowing for communication with the communication target outside of the vehicle C to be easily stabilized. Also, connecting the antenna provided on the outer side of the vehicle C on the roof R, for example, an antenna relating to radio and an antenna relating to television, and the onboard relay apparatus 1 (outside-vehicle communication circuit 43) is easy.

The first substrate 140 is provided with a noise suppression member 141. The noise suppression member 141 is provided inside the first substrate 140, in other words between the roof R side surface and the floor F side surface. The noise suppression member 141, for example, is an electromagnetic shielding member, such as a sheet made of magnetic metal, a sheet made of resin containing magnetic metal, or the like. The noise suppression member 141, for example, has a rectangular shape that extends in a direction orthogonal to the vertical direction of the vehicle C. The noise suppression member 141 effectively suppresses noise propagating from the outside-vehicle communication circuit 43 and noise propagating to the outside-vehicle communication circuit 43. Because noise propagation is suppressed, communication using the mounted outside-vehicle communication apparatus 40 (outside-vehicle communication circuit 43) can be performed with stability. The noise suppression member 141 corresponds to a first noise suppression member in the claims.

The first branch line connector 70 can be used to connected to the outside-vehicle communication apparatus 40 not built in the onboard relay apparatus 1. For example, in a case where the GPS receiver is not built-in (mounted in) the onboard relay apparatus 1, the onboard relay apparatus 1 connects to the GPS receiver via the first branch line connector 70. The GPS receiver is attached externally, so to speak. For example, the outside-vehicle communication apparatus 40 relating to communication using a communication standard that onboard relay apparatus 1 is not compatible with is connected to the onboard relay apparatus 1 via the first branch line connector 70. By the control program of the outside-vehicle communication apparatus 40 being stored in the storage unit 102, the onboard relay apparatus 1 is capable of communicating using the incompatible communication standard.

Fourth Embodiment

Figure 6:
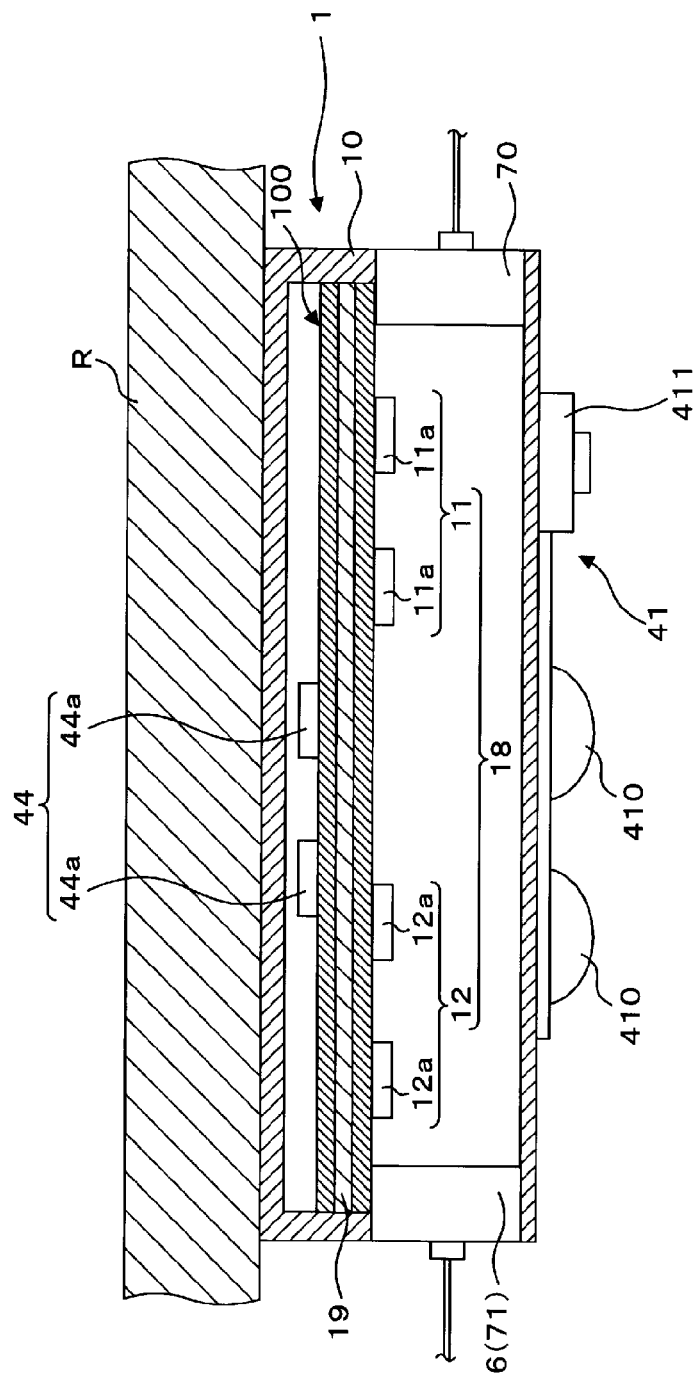
FIG. 6 is a schematic cross-sectional view illustrating the configuration of an onboard relay apparatus according to a fourth embodiment.

FIG. 6 is a schematic cross-sectional view illustrating the configuration of the onboard relay apparatus 1 according to the fourth embodiment. For the configuration according to the fourth embodiment, components similar to that in the first embodiment are given the same reference sign and detailed descriptions thereof are omitted. The onboard relay apparatus 1 of the fourth embodiment is attached to the roof R of the vehicle C.

In the onboard relay apparatus 1 of the fourth embodiment, an electric circuit 18 including the first circuit 11 and the second circuit 12 is formed on the floor F side surface (lower surface) of the circuit board 100. The first circuit 11 and the second circuit 12 are electrically connected. The circuit board 100 is provided with the main line connector 6, the first branch line connector 70, and the second branch line connector 71 on the lower surface. In other words, the circuit board 100 is provided with the main line connector 6 and the branch line connectors on the lower surface.

The main line connector 6 and the branch line connectors (the first branch line connector 70 and the second branch line connector 71) are attached to a side portion of the lower surface of the circuit board 100. In FIG. 6, the first branch line connector 70 is attached to a side portion at the rear side of the circuit board 100. A portion of the first branch line connector 70 is exposed to the outside from the housing 10 via an opening provided in the side surface at the rear side of the housing 10. In other words, the first branch line connector 70 is provided on (attached to) the side surface at the rear side of the housing 10. The first branch line connector 70 may be attached to the side portion at a side other than the rear side of the circuit board 100 (side surface at a side other than the rear side of the housing 10). The first branch line connector 70 is connected to the first circuit 11. In other words, the first branch line connector 70 is connected to the electric circuit 18.

In FIG. 6, as in the first embodiment, the main line connector 6 and the second branch line connector 71 are attached to a side portion at the front side of the circuit board 100. In other words, the main line connector 6 and the second branch line connector 71 are provided on (attached to) the side surface at the front side of the housing 10. The main line connector 6 and the second branch line connector 71 may be attached to the side portion at a side other than the front side of the circuit board 100 (side surface at a side other than the front side of the housing 10). The main line connector 6 and the second branch line connector 71 are connected to the second circuit 12. In other words, the main line connector 6 and the branch line connectors (the first branch line connector 70 and the second branch line connector 71) are connected to the electric circuit 18.

The outside-vehicle communication apparatus 40 is mounted on the roof R side surface (upper surface) of the circuit board 100. In other words, the outside-vehicle communication apparatus 40 is built in the onboard relay apparatus 1. Specifically, an outside-vehicle communication circuit 44 for implementing the function of the outside-vehicle communication apparatus 40 is formed on the roof R side surface of the circuit board 100. The outside-vehicle communication circuit 44 includes a communication circuit (wireless circuit) for communicating with the communication target outside of the vehicle C and includes electronic components 44*a*, such as a transistor, a diode, a capacitor, an antenna, an IC, and the like that constituted the communication circuit. The outside-vehicle communication circuit 44 and the electronic components 44*a* are similar to the outside-vehicle communication circuit 43 and the electronic components 43*a* of the third embodiment. Thus, descriptions of the outside-vehicle communication circuit 44 and the electronic components 44*a* will be omitted. The outside-vehicle communication circuit 44 is electrically connected to the first circuit 11 (electric circuit 18) formed on the floor F side surface (lower surface) of the circuit board 100 via a through hole provided in the circuit board 100. The onboard relay apparatus 1 is capable of communicating with the communication target outside of the vehicle C via the outside-vehicle communication circuit 44.

A noise suppression member 19 is provided inside the circuit board 100, in other words, between the roof R side surface and the floor F side surface in the circuit board 100. The noise suppression member 19 suppresses noise propagating from the outside-vehicle communication circuit 44 to the electric circuit 18 and noise propagating from the electric circuit 18 to the outside-vehicle communication circuit 44. Because noise propagating to the outside-vehicle communication circuit 44 is suppressed, communication using the mounted outside-vehicle communication apparatus 40 (outside-vehicle communication circuit 44) can be performed with stability.

As in the third embodiment, the first branch line connector 70 can be used to connected to the outside-vehicle communication apparatus 40 not built in the onboard relay apparatus 1. Because the outside-vehicle communication apparatus 40 is built in the onboard relay apparatus 1, an increase in the number of communication lines and power lines provided on the roof R for connecting the onboard relay apparatus 1 and the outside-vehicle communication apparatus 40 can be suppressed. The outside-vehicle communication apparatus 40 is mounted (the outside-vehicle communication circuit 44 is formed) on the upper surface of the circuit board 100, allowing for communication with the communication target outside of the vehicle C to be easily stabilized. Also, connecting the antenna provided on the outer side of the vehicle C on the roof R, for example, an antenna relating to radio and an antenna relating to television, and the onboard relay apparatus 1 (outside-vehicle communication circuit 44) is easy.

Fifth Embodiment

Figure 7:
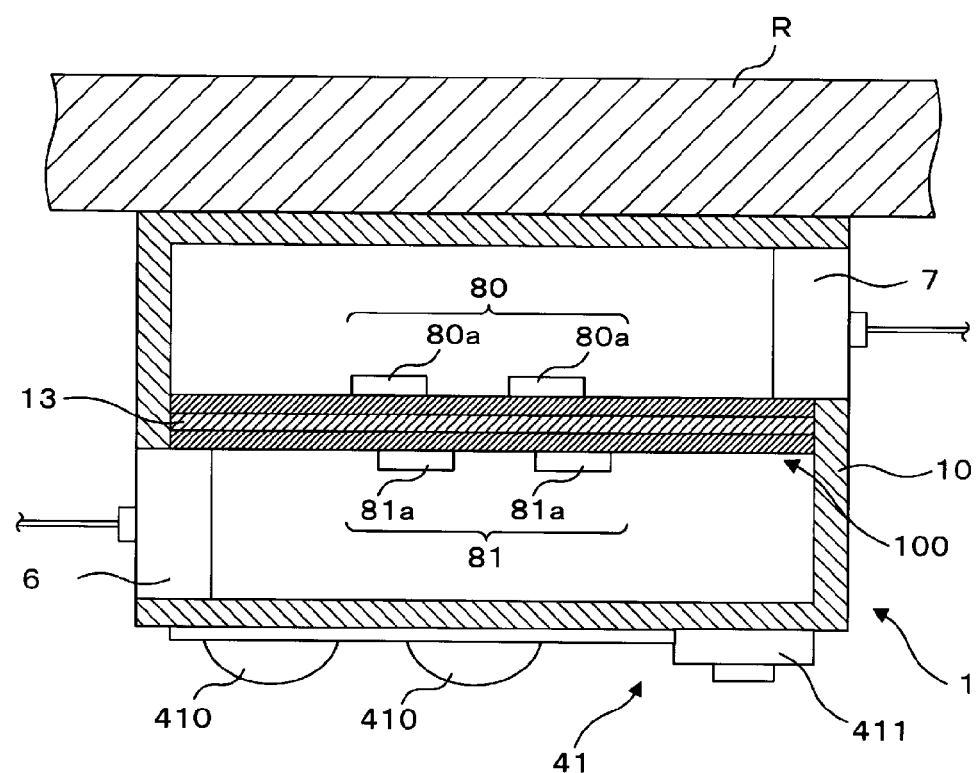
FIG. 7 is a schematic cross-sectional view illustrating the configuration of an onboard relay apparatus according to a fifth embodiment.

FIG. 7 is a schematic cross-sectional view illustrating the configuration of the onboard relay apparatus 1 according to the fifth embodiment. For the configuration according to the fifth embodiment, components similar to that in the first embodiment are given the same reference sign and detailed descriptions thereof are omitted. The onboard relay apparatus 1 of the fifth embodiment is attached to the roof R of the vehicle C.

In the onboard relay apparatus 1 of the fifth embodiment, the circuit board 100 includes the branch line connector 7 including the first branch line connector 70 and the second branch line connector 71 and the main line connector 6. In FIG. 7, the branch line connector 7 is attached to the side portion at the rear side of the roof R side surface (upper surface) of the circuit board 100. A portion of the branch line connector 7 is exposed to the outside from the housing 10 via an opening provided in the side surface at the rear side of the housing 10. In other words, the first branch line connector 70 is provided on the side surface at the rear side of the housing 10 (onboard relay apparatus 1). A power line and a communication line provided on the roof R and connected to the onboard load 4 are connected at a portion of the branch line connector 7. The arrangement of the branch line connector 7 is not limited to the arrangement described above. The branch line connector 7 may be attached to the side portion at a side other than the rear side at the upper surface of the circuit board 100. For example, the branch line connector 7 may be attached to the side portion of the floor F side surface (lower surface) of the circuit board 100.

In FIG. 7, the main line connector 6 is attached to the side portion at the front side of the floor F side surface (lower surface) of the circuit board 100. A portion of the main line connector 6 is exposed to the outside from the housing 10 via an opening provided in the side surface at the front side of the housing 10. A power line and a communication line provided on the pillar P and connected to the relay device 2 and the power supply apparatus 5 are connected at a portion of the main line connector 6. The arrangement of the main line connector 6 is not limited to the arrangement described above. The main line connector 6 may be attached to the side portion at a side other than the front side at the lower surface of the circuit board 100. The main line connector 6 may be attached to the side portion of the upper surface of the circuit board 100. A power supply group connector to which a group of the power lines connected to the plurality of onboard devices (the onboard loads 4, the relay device 2, and the power supply apparatus 5) are connected and a communication line group connector to which a group of communication lines connected to the plurality of onboard devices are connected may be attached to the circuit board 100.

A communication circuit 80 for communicating with the onboard loads 4 and the relay device 2 is formed on the upper surface of the circuit board 100. The communication circuit 80 includes an electronic component 80*a*, such as a transistor, a diode, a capacitor, an IC, or the like. The communication circuit 80 is connected to the main line connector 6 and the branch line connector 7.

A power supply circuit 81 for distributing the power supplied from the power supply apparatus 5 to the onboard loads 4 is formed on the lower surface of the circuit board 100. The power supply circuit 81 includes an electronic component 81*a*, such as a transistor, a diode, a capacitor, an IC, or the like. The power supply circuit 81 is connected to the main line connector 6 and the branch line connector 7. The communication circuit 80 and the power supply circuit 81 are connected via a through hole provided in the circuit board 100, for example. Power is supplied from the power supply circuit 81 to the electronic component 80*a* (communication circuit 80) via the through hole. The communication circuit 80 and the power supply circuit 81 may be connected to the map lamp 41. The communication circuit 80 (electronic component 80*a*) and the power supply circuit 81 (electronic component 81*a*) form each functional block of the onboard relay apparatus 1.

Figure 8:
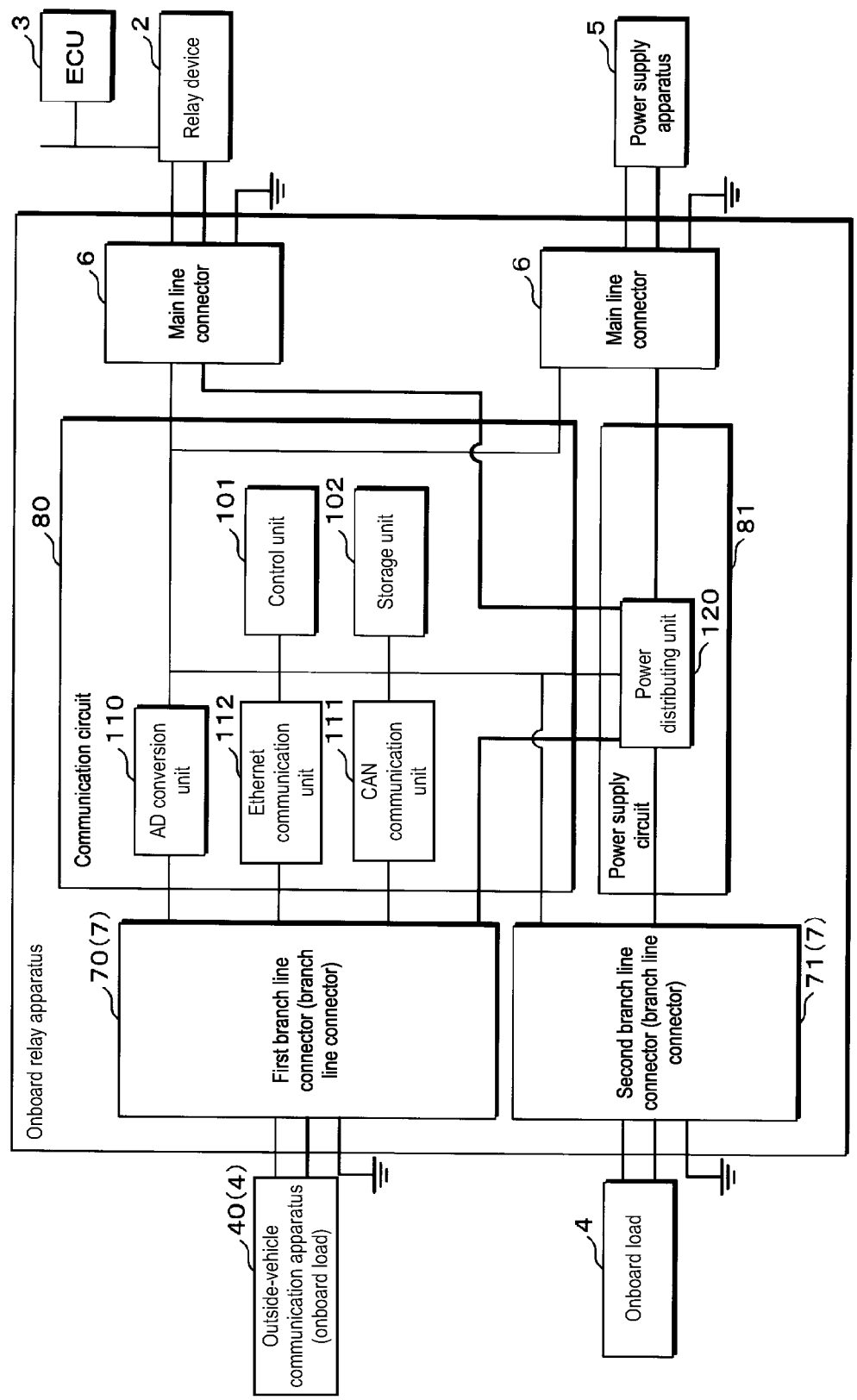
FIG. 8 is a block diagram illustrating in a plan view the functional blocks of the onboard relay apparatus including a communication circuit and a power supply circuit.

FIG. 8 is a block diagram illustrating in a plan view the functional blocks of the onboard relay apparatus 1 including the communication circuit 80 and the power supply circuit 81. The onboard relay apparatus 1 is provided with a control unit 101 and a storage unit 102. In FIG. 8, the control unit 101 and the storage unit 102 are included in the communication circuit 80. In other words, the control unit 101 and the storage unit 102 are constituted by the electronic component 80*a*. The control unit 101 and the storage unit 102 may be included in the power supply circuit 81 (may be constituted by the electronic component 81*a*).

The onboard relay apparatus 1 is provided with the AD conversion unit 110, the CAN communication unit 111, and the Ethernet communication unit 112. The AD conversion unit 110, the CAN communication unit 111, and the Ethernet communication unit 112 are included in the communication circuit 80. The AD conversion unit 110, the CAN communication unit 111, and the Ethernet communication unit 112 are connected to the branch line connector 7 and the main line connector 6. The communication circuit 80 may include the analog signal circuit described above. The communication circuit 80 may include the analog signal multiplexing unit described above. The control unit 101 communicates with the relay device 2 and the onboard load 4 (outside-vehicle communication apparatus 40) via the communication circuit 80 (the AD conversion unit 110, the CAN communication unit 111, and the Ethernet communication unit 112), the main line connector 6, and the branch line connector 7. In other words, the control unit 101 controls relaying the communication with the relay device 2 and the onboard loads 4 via the communication circuit 80.

The onboard relay apparatus 1 is provided with the power distributing unit 120 included in the power supply circuit 81. The power distributing unit 120 includes a fuse and a relay as described above. The power distributing unit 120 is connected to the branch line connector 7 (the first branch line connector 70 and the second branch line connector 71) and the main line connector 6. The power supplied from the power supply apparatus 5 via the power line provided on the pillar P is distributed to the onboard loads 4 via the power supply circuit 81 (power distributing unit 120) and the branch line connector 7. The power may be distributed to the relay device 2 via the power supply circuit 81 and the main line connector 6. The control unit 101 controls the supply and cut off of power supplied from the power supply apparatus 5 and distributed to the onboard loads 4 as described above. The power supplied from the power supply apparatus 5 is distributed at the power supply circuit 81 and a high voltage current occurs at the power supply circuit 81. The power supply circuit 81 is a so-called high voltage circuit, and noise tends to easily propagate to other circuits. Note that the communication circuit 80 is a so-called low voltage circuit.

The onboard relay apparatus 1 is connected to the plurality of onboard loads 4 provided on the roof R via power lines and communication lines provided on the roof R. Also, the relay device 2 and the power supply apparatus 5 provided in an area other than the roof R are connected via a power line and a communication line provided on the pillar P. In other words, the onboard loads 4 and the relay device 2 and the power supply apparatus 5 are connected via the onboard relay apparatus 1 and not connected individually. Thus, an increase to the number of communication lines and power lines provided on the pillar P can be suppressed.

Because the communication circuit 80 and the power supply circuit 81 are separated in the vertical direction, noise propagating from the communication circuit 80 to the power supply circuit 81 and noise propagating from the power supply circuit 81 to the communication circuit 80 can be suppressed. As illustrated in FIG. 7, the noise suppression member 13 is provided inside (between the upper surface and the lower surface) of the circuit board 100. In other words, the noise suppression member 13 is provided between the communication circuit 80 and the power supply circuit 81. The noise suppression member 13 effectively suppresses noise propagating from the communication circuit 80 to the power supply circuit 81 and noise propagating from the power supply circuit 81 to the communication circuit 80. Because noise propagation to the communication circuit 80 is suppressed, communication between the relay device 2 and the onboard loads 4 can be stably relayed.

By using both surfaces (the roof R side surface and the floor F side surface) of the circuit board 100, the onboard relay apparatus 1 can be made compact. The power supplied from the power supply apparatus 5 is distributed at the power supply circuit 81 and a high voltage current occurs at the power supply circuit 81. Also, because the power supply circuit 81 includes a relay, a fuse, and the like, the amount of heat generated at the power supply circuit is increased. The power supply circuit 81 is formed on the lower surface of the circuit board 100, in other words, the cabin side surface of the vehicle C. Thus, the heat generated at the power supply circuit 81 can be effectively dissipated to the cabin of the vehicle C where there is air conditioning.

Sixth Embodiment

Figure 9:
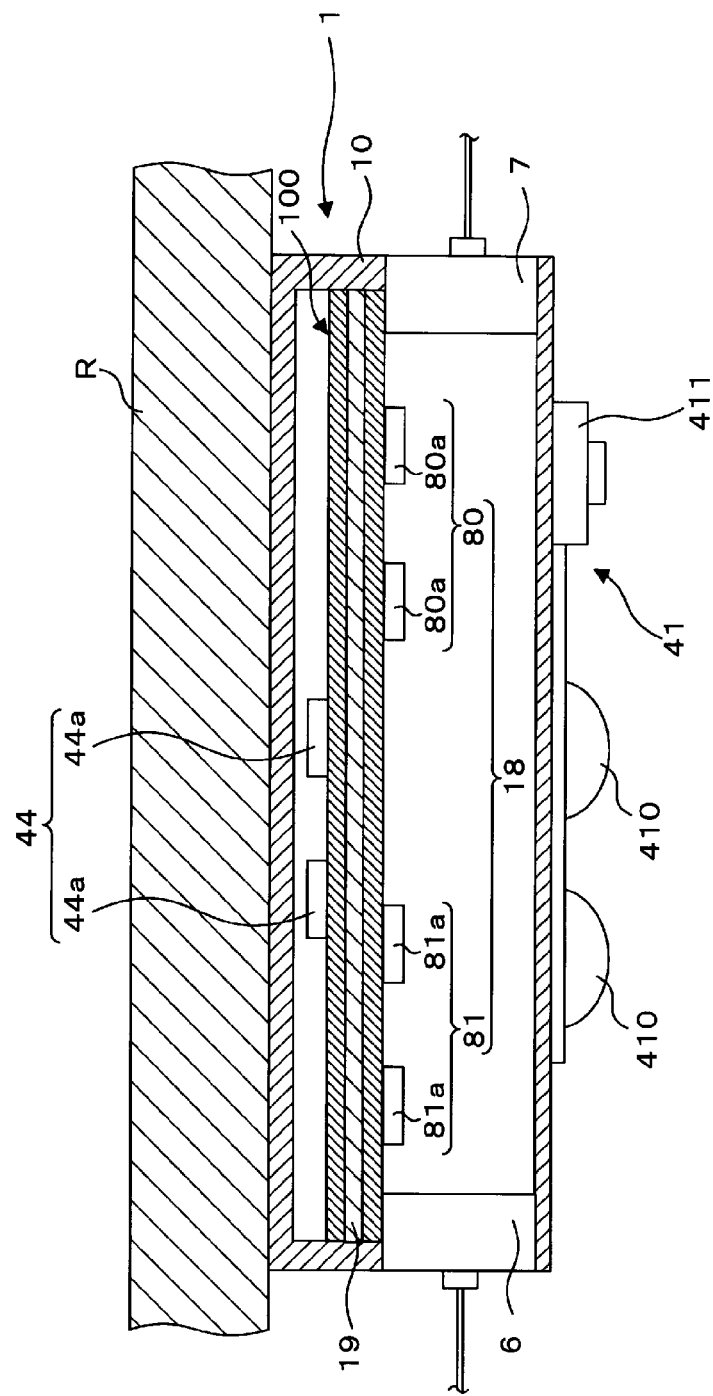
FIG. 9 is a schematic cross-sectional view illustrating the configuration of an onboard relay apparatus according to a sixth embodiment.

FIG. 9 is a schematic cross-sectional view illustrating the configuration of the onboard relay apparatus 1 according to the sixth embodiment. For the configuration according to the sixth embodiment, components similar to that in the fourth embodiment are given the same reference sign and detailed descriptions thereof are omitted. The onboard relay apparatus 1 of the sixth embodiment is attached to the roof R of the vehicle C.

In the onboard relay apparatus 1 of the sixth embodiment, the electric circuit 18 including the communication circuit 80 and the power supply circuit 81 is formed on the floor F side surface (lower surface) of the circuit board 100. The communication circuit 80 and the power supply circuit 81 are similar to the communication circuit 80 and the power supply circuit 81 of the fifth embodiment, and thus detailed descriptions thereof are omitted. The main line connector 6 and the branch line connector 7 are attached to the floor F side surface (lower surface) of the circuit board 100. The main line connector 6 and the branch line connector 7 are connected to the communication circuit 80 and the power supply circuit 81, respectively. In other words, the main line connector 6 and the branch line connector 7 are connected to the electric circuit 18. The map lamp 41 may be connected to the electric circuit 18 via a not-illustrated wire.

Because the communication circuit 80 and the power supply circuit 81 are disposed separated (away from one another) in the front-and-back direction of the vehicle C at the lower surface of the circuit board 100, noise propagating from the communication circuit 80 to the power supply circuit 81 and noise propagating from the power supply circuit 81 to the communication circuit 80 can be suppressed. In FIG. 9, the communication circuit 80 is provided to the rear, and the power supply circuit 81 is provided to the front. The communication circuit 80 and the power supply circuit 81 may be provided separated in the left-and-right direction of the vehicle C, for example.

The outside-vehicle communication apparatus 40 is mounted on the roof R side surface (upper surface) of the circuit board 100. In other words, the outside-vehicle communication circuit 44 for implementing the function of the outside-vehicle communication apparatus 40 is formed on the upper surface of the circuit board 100. The outside-vehicle communication circuit 44, for example, is connected to the communication circuit 80 and the power supply circuit 81 via a through hole provided in the circuit board 100. The onboard relay apparatus 1 is capable of communicating with the communication target outside of the vehicle C via the outside-vehicle communication circuit 44. Because the outside-vehicle communication apparatus 40 is mounted on (built in) the onboard relay apparatus 1, an increase in the number of communication lines and power lines for connecting the onboard relay apparatus 1 and the outside-vehicle communication apparatus 40 can be suppressed.

The noise suppression member 19 is provided between the upper surface and the lower surface of the circuit board 100, in other words, between the mounted outside-vehicle communication apparatus 40 (outside-vehicle communication circuit 44) and the communication circuit 80. The noise suppression member 19 suppresses noise propagating to the outside-vehicle communication circuit 44 and noise propagating from the outside-vehicle communication circuit 44. Because noise propagating to the outside-vehicle communication circuit 44 is suppressed, communication using the outside-vehicle communication circuit 44 can be performed with stability.

Seventh Embodiment

Figure 10:
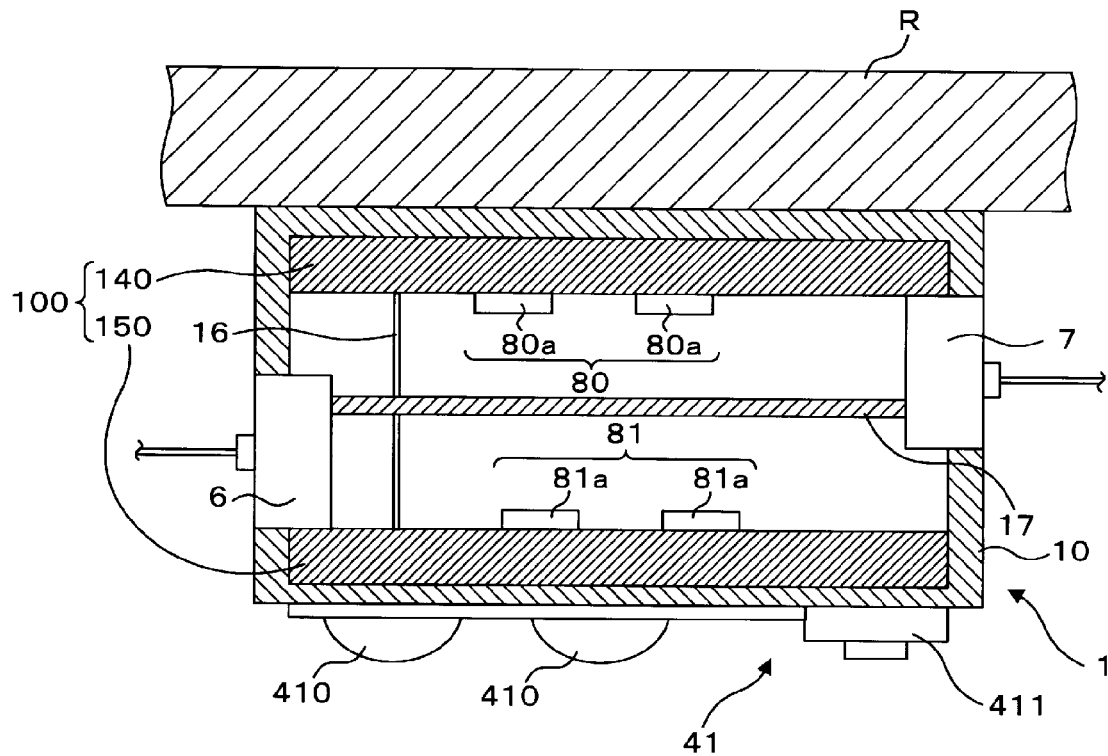
FIG. 10 is a schematic cross-sectional view illustrating the configuration of an onboard relay apparatus according to a seventh embodiment.

FIG. 10 is a schematic cross-sectional view illustrating the configuration of the onboard relay apparatus 1 according to the seventh embodiment. For the configuration according to the seventh embodiment, components similar to that in the second embodiment are given the same reference sign and detailed descriptions thereof are omitted. The onboard relay apparatus 1 of the seventh embodiment is attached to the roof R of the vehicle C.

In the onboard relay apparatus 1 of the seventh embodiment, the first substrate 140 and the second substrate 150 are disposed aligned in the vertical direction and facing one another as in the second embodiment. The first substrate 140 is provided with one of either the branch line connector 7 or the main line connector 6 disposed on the roof R side (upper side) on the surface (floor F side surface) facing the second substrate 150. The second substrate 150 is provided with the other one of either the branch line connector 7 or the main line connector 6 disposed on the floor F side (lower side) on the surface (roof R side surface) facing the first substrate 140.

In FIG. 10, the branch line connector 7 is attached to the side portion at the rear side of the floor F side surface of the first substrate 140. A portion of the branch line connector 7 is exposed to the outside from the housing 10 via an opening provided in the side surface at the rear side of the housing 10. In other words, the branch line connector 7 is provided on the side surface at the rear side of the housing 10. The main line connector 6 is attached to the side portion at the front side of the roof R side surface of the second substrate 150. A portion of the main line connector 6 is exposed to the outside from the housing 10 via an opening provided in the side surface at the front side of the housing 10. In other words, the main line connector 6 is provided on the side surface at the front side of the housing 10.

The main line connector 6 and the branch line connector 7 are each provided on different side surfaces of the housing 10 and overlap in the thickness direction of the onboard relay apparatus 1 (housing 10). In other words, the main line connector 6 and the branch line connectors 7 do not overlap in a front view of the onboard relay apparatus 1. Because they overlap in the thickness direction, the width of the side surfaces of the onboard relay apparatus 1 can be reduced. In other words, the height of the side surfaces of the onboard relay apparatus 1 can be reduced, and the thickness of the onboard relay apparatus 1 can be reduced. As long as the main line connector 6 and the branch line connector 7 overlap in the thickness direction, the arrangement of the branch line connector 7 and the main line connector 6 is not limited to the arrangement described above.

The communication circuit 80 is formed on the floor F side surface of the first substrate 140. The power supply circuit 81 is formed on the roof R side surface of the second substrate 150. The communication circuit 80 and the power supply circuit 81 are similar to the communication circuit 80 and the power supply circuit 81 of the fifth embodiment, and thus detailed descriptions thereof are omitted. The main line connector 6 and the branch line connector 7 are connected to the communication circuit 80 and the power supply circuit 81, respectively. The communication circuit 80 and the power supply circuit 81 are electrically connected via the wire 16 including a power line. The electronic component 80a, in other words the communication circuit 80, is supplied with power from the power supply circuit 81 via the wire 16. The electronic component 80a, for example the IC of the communication circuit 80, is driven by the power. The map lamp 41 may be connected to the communication circuit 80 and the power supply circuit 81 via a not-illustrated wire.

The onboard relay apparatus 1 is connected to the plurality of onboard loads 4 provided on the roof R via power lines and communication lines provided on the roof R. Also, the relay device 2 and the power supply apparatus 5 provided in an area other than the roof R are connected via a power line and a communication line provided on the pillar P. The onboard relay apparatus 1 supplies and cuts off the power supplied from the power supply apparatus 5 and distributed to the onboard loads 4. The onboard relay apparatus 1 relays communication between the onboard loads 4 and the relay device 2. The onboard loads 4 and the relay device 2 and the power supply apparatus 5 are connected via the onboard relay apparatus 1 and not connected individually. Thus, an increase to the number of communication lines and power lines provided on the pillar P can be suppressed.

The area of the roof R where the onboard relay apparatus 1 and the onboard loads 4 can be placed is limited. The first substrate 140 and the second substrate 150 are disposed aligned in the vertical direction, allowing the onboard relay apparatus 1 to be made compact. In other words, the area required for attaching the onboard relay apparatus 1 is decreased, and the limited area of the roof R can be effectively used.

The first substrate 140 and the second substrate 150 are disposed aligned in the vertical direction, with the communication circuit 80 and the power supply circuit 81 being separated in the vertical direction. Thus, noise propagating from the communication circuit 80 to the power supply circuit 81 and noise propagating from the power supply circuit 81 to the communication circuit 80 can be suppressed. The noise suppression member 17 is provided between the first substrate 140 and the second substrate 150, in other words between the communication circuit 80 and the power supply circuit 81. The noise suppression member 17 effectively suppresses noise propagating from the power supply circuit 81 to the communication circuit 80. Because noise propagation to the communication circuit 80 is suppressed, communication between the relay device 2 and the onboard loads 4 can be stably relayed.

The power supplied from the power supply apparatus 5 is distributed at the power supply circuit 81 and a high voltage current occurs at the power supply circuit 81. Also, because the power supply circuit 81 includes a relay, a fuse, and the like, the amount of heat generated at the power supply circuit 81 is increased. Because the power supply circuit 81 is formed on the second substrate 150, the heat generated at the power supply circuit 81 can be effectively dissipated to the cabin of the vehicle C where there is air conditioning.

Eighth Embodiment

Figure 11:
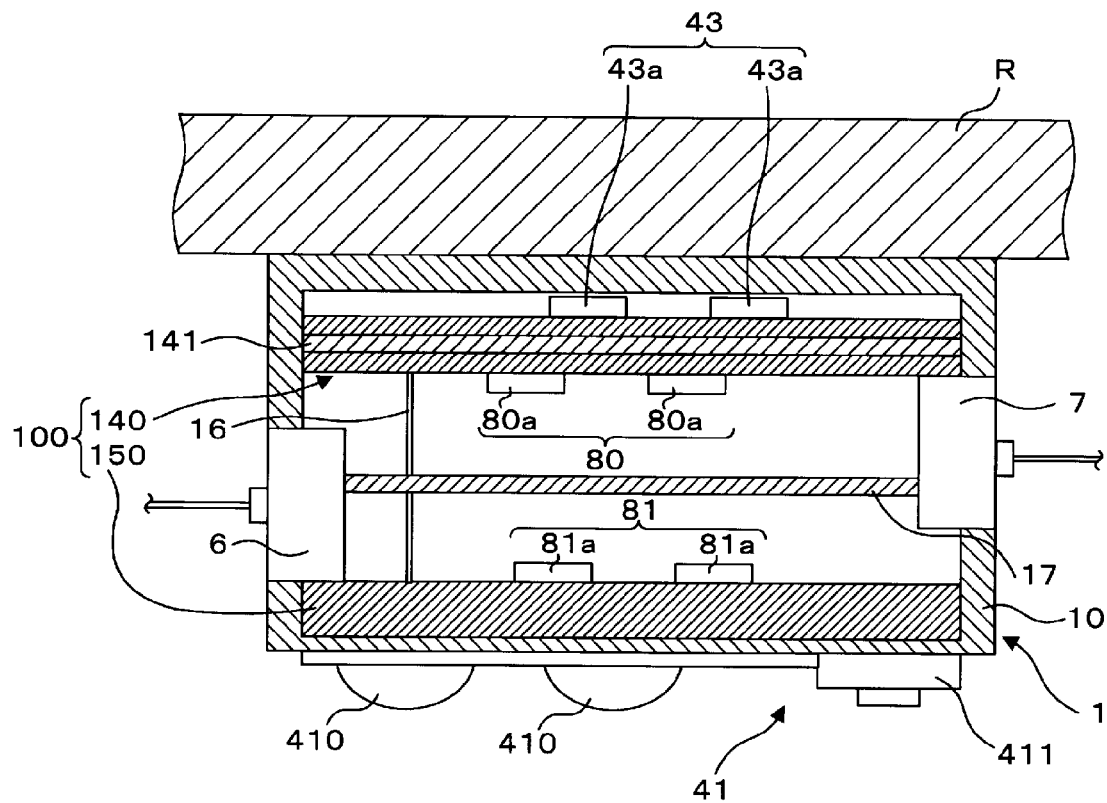
FIG. 11 is a schematic cross-sectional view illustrating the configuration of an onboard relay apparatus according to an eighth embodiment.

FIG. 11 is a schematic cross-sectional view illustrating the configuration of the onboard relay apparatus 1 according to the eighth embodiment. For the configuration according to the eighth embodiment, components similar to that in the seventh embodiment are given the same reference sign and detailed descriptions thereof are omitted. The onboard relay apparatus 1 of the eighth embodiment is attached to the roof R of the vehicle C.

In the onboard relay apparatus 1 of the eighth embodiment, the circuit board 100 includes a plurality of substrates provided from the roof R side toward the floor F side. The plurality of substrates include the first substrate 140 and the second substrate 150.

The first substrate 140 is formed in the space between the inner surfaces on the roof R side of the housing 10 inside the housing 10. The outside-vehicle communication apparatus 40 is mounted on the roof R side surface (upper surface) of the first substrate 140, in other words, the surface opposite the surface facing the second substrate 150. In other words, an outside-vehicle communication circuit 43 for implementing the function of the outside-vehicle communication apparatus 40 is formed on the roof R side surface of the first substrate 140. The outside-vehicle communication circuit 43 is similar to the outside-vehicle communication circuit 43 of the third embodiment, and thus a detailed description thereof is omitted.

The communication circuit 80 is formed on the floor F side surface (lower surface) of the first substrate 140. The communication circuit 80 and the outside-vehicle communication circuit 43 are connected via a through hole provided in the circuit board 100, for example. The power supply circuit 81 is formed on the roof R side surface (upper surface) of the second substrate 150. The power supply circuit 81 and the outside-vehicle communication circuit 43 are connected via a not-illustrated wire, for example. The three surfaces, the surface on which the outside-vehicle communication apparatus 40 is mounted (the surface on which the outside-vehicle communication circuit 43 is formed), the surface on which the communication circuit 80 is formed, and the surface on which the power supply circuit 81, are disposed aligned in the vertical direction. In other words, the three surfaces, the surface on which the outside-vehicle communication apparatus 40 is mounted, the surface on which the communication circuit 80 is formed, and the surface on which the power supply circuit 81 is formed, in this order from the roof R side toward the floor F side form a multilayer structure. Thus, noise propagating from the three circuits of the outside-vehicle communication circuit 43, the communication circuit 80, and the power supply circuit 81 and noise propagating to the three circuits can be suppressed. In other words, noise propagating between the three circuits can be suppressed.

The arrangement of the outside-vehicle communication circuit 43, the communication circuit 80, and the power supply circuit 81 is not limited to the arrangement described above. The outside-vehicle communication circuit 43 may be formed on the lower surface of the first substrate 140. In this case, the communication circuit 80 is formed on the upper surface of the second substrate 150, and the power supply circuit 81 is formed on the lower surface of the second substrate 150, for example. For example, the onboard relay apparatus 1 may be provided with the first substrate 140 on which the outside-vehicle communication circuit 43 is formed, the second substrate 150 on which the power supply circuit 81 is formed, and a third substrate on which the communication circuit 80 is formed provided between the first substrate 140 and the second substrate 150.

The noise suppression member 141 is provided inside the first substrate 140, in other words, between the outside-vehicle communication circuit 43 (the mounted outside-vehicle communication apparatus 40) and the communication circuit 80. The noise suppression member 141 effectively suppresses noise propagating to the outside-vehicle communication circuit 43 and noise propagating from the outside-vehicle communication circuit 43. Because noise propagating to the outside-vehicle communication circuit 43 is suppressed, communication using the outside-vehicle communication circuit 43 can be performed with stability. The noise suppression member 141 corresponds to a first noise suppression member.

The noise suppression member 17 is provided between the first substrate 140 and the second substrate 150, in other words between the communication circuit 80 and the power supply circuit 81. The noise suppression member 17 effectively suppresses noise propagating from the communication circuit 80 to the power supply circuit 81 and noise propagating from the power supply circuit 81 to the communication circuit 80. Because noise propagation to the communication circuit 80 is suppressed, communication between the relay device 2 and the onboard loads 4 can be more stably relayed. The noise suppression member 17 corresponds to a second noise suppression member.

Because the surface on which the outside-vehicle communication apparatus 40 is mounted is disposed on the roof R side, the communications of the outside-vehicle communication apparatus 40 are easily stabilized. The power supplied from the power supply apparatus 5 is distributed at the power supply circuit 81 and a high voltage current occurs at the power supply circuit 81. Also, because the power supply circuit 81 includes a relay, a fuse, and the like, the amount of heat generated at the power supply circuit is increased. Because the surface on which the power supply circuit is formed is disposed on the floor side, the heat generated at the power supply circuit can be effectively dissipated to the vehicle cabin where there is air conditioning.

The embodiments disclosed herein are examples in all respects and should not be interpreted as limiting in any manner. The scope of the present disclosure is defined not by the foregoing description, but by the scope of the claims, and all modifications that are equivalent to or within the scope of the claims are included.

The invention claimed is:

1. An onboard relay apparatus installed in a vehicle and connected to a plurality of onboard devices and configured to relay communication to the plurality of onboard devices, the onboard relay apparatus provided on a roof of the vehicle, the plurality of onboard devices including an onboard load provided on the roof and a power supply apparatus that supplies power and a second onboard relay apparatus provided in an area other than the roof, the onboard relay apparatus comprising:
   a branch line connector connected to the onboard load via a power line and a communication line provided on the roof;
   a main line connector connected to the power supply apparatus and the second onboard relay apparatus via a power line and a communication line provided on a pillar of the vehicle; and a control unit configured to control supplying and cutting off power supplied from the power supply apparatus via a power line provided on the pillar and distributed to the onboard load via one of a plurality of power lines provided on the roof, and to control relaying communication to the onboard load and the second onboard relay apparatus.

2. The onboard relay apparatus according to claim 1, further comprising:
a circuit board including the branch line connector and the main line connector, wherein the circuit board
includes a communication circuit disposed on a surface of the circuit board on the roof side for communicating with the onboard load and the second onboard relay apparatus and
a power supply circuit disposed on a surface of the circuit board on a floor side of the vehicle for distributing power supplied from the power supply apparatus to the onboard load.

3. The onboard relay apparatus according to claim 1, further comprising:
a circuit board including the branch line connector and the main line connector, wherein the circuit board includes
a first substrate disposed on the roof side and including a communication circuit for communicating with the onboard load and the second onboard relay apparatus and
a second substrate disposed on a floor side of the vehicle and including a power supply circuit that distributes power supplied from the power supply apparatus to the onboard load; and
the communication circuit is supplied with power from the power supply circuit.

4. The onboard relay apparatus according to claim 3, wherein the first substrate and the second substrate are disposed facing one another;
the first substrate includes the communication circuit and one of the branch line connector or the main line connector on a surface facing the second substrate;
the second substrate includes the power supply circuit and the other one of the branch line connector or the main line connector on a surface facing the first substrate; and
the branch line connector and the main line connector overlap in a thickness direction.

5. The onboard relay apparatus according to claim 2, further comprising:
a noise suppression member that suppresses noise propagation disposed between the communication circuit and the power supply circuit.

6. The onboard relay apparatus according to claim 1, further comprising:
a circuit board including the branch line connector and the main line connector, wherein
the onboard load includes an outside-vehicle communication apparatus configured to communicate with a communication target outside of the vehicle;
the circuit board includes a plurality of substrates provided from the roof side toward a floor side of the vehicle;
surfaces of the plurality of substrates include
a surface on which the outside-vehicle communication apparatus is mounted,
a surface on which a communication circuit for communicating with the onboard load and the second onboard relay apparatus is formed, and
a surface on which a power supply circuit for distributing power supplied from the power supply apparatus to the onboard load is formed; and
the surface on which the outside-vehicle communication apparatus is mounted, the surface on which the communication circuit is formed, and the surface on which the power supply circuit is formed are arranged in this order from the roof side to the floor side and form a multilayer structure.

7. The onboard relay apparatus according to claim 6, further comprising:
a first noise suppression member that suppresses noise propagation disposed between the outside-vehicle communication apparatus and the communication circuit.

8. The onboard relay apparatus according to claim 6, further comprising:
a second noise suppression member that suppresses noise propagation disposed between the communication circuit and the power supply circuit.

9. The onboard relay apparatus according to claim 1, further comprising:
a circuit board including the branch line connector and the main line connector, wherein
the onboard load includes an outside-vehicle communication apparatus configured to communicate with a communication target outside of the vehicle;
the branch line connector includes
a first branch line connector connected to the outside-vehicle communication apparatus and
a second branch line connector connected to the onboard load other than the outside-vehicle communication apparatus; and
the circuit board includes:
the first branch line connector and a first circuit connected to the first branch line connector, on a surface of the circuit board on a roof side of the vehicle; and
the second branch line connector, the main line connector, and a second circuit connected to the second branch line connector and the main line connector, on a surface of the circuit board on a floor side of the vehicle.

10. The onboard relay apparatus according to claim 9, wherein the circuit board includes, inside the circuit board, a noise suppression member that suppresses noise propagation.

11. The onboard relay apparatus according to claim 1, further comprising:
a circuit board including the branch line connector and the main line connector, wherein
the onboard load includes an outside-vehicle communication apparatus configured to communicate with a communication target outside of the vehicle;
the branch line connector includes
a first branch line connector connected to the outside-vehicle communication apparatus and
a second branch line connector connected to the onboard load other than the outside-vehicle communication apparatus;
the circuit board includes:
a first substrate disposed on a roof side of the vehicle and including the first branch line connector and a first circuit connected to the first branch line connector; and
a second substrate disposed on a floor side of the vehicle and including the second branch line connector, the main line connector, and a second circuit connected to the second branch line connector and the main line connector, and the first substrate and the second substrate are connected via a power line and a communication line.

12. The onboard relay apparatus according to claim 11, wherein the first substrate and the second substrate are disposed facing one another;

the first substrate includes the first branch line connector and the first circuit on a surface facing the second substrate;

the second substrate includes the second branch line connector, the main line connector, and the second circuit on a surface facing the first substrate; and the first branch line connector, the second branch line connector, and the main line connector overlap in a thickness direction.

13. The onboard relay apparatus according to claim 12, wherein the outside-vehicle communication apparatus is mounted on a surface of the first substrate opposite a surface facing the second substrate.

14. The onboard relay apparatus according to claim 13, wherein the first substrate includes, inside the first substrate, a first noise suppression member that suppresses noise propagation.

15. The onboard relay apparatus according to claim 11, further comprising:

a second noise suppression member that suppresses noise propagation disposed between the first substrate and the second substrate.

16. The onboard relay apparatus according to claim 1, further comprising:

a circuit board including the branch line connector and the main line connector, wherein the onboard load includes an outside-vehicle communication apparatus configured to communicate with a communication target outside of the vehicle;

the outside-vehicle communication apparatus is mounted on a surface of the circuit board on a roof side of the vehicle; and the circuit board includes:

on a surface on a floor side of the vehicle, the branch line connector, the main line connector, and an electric circuit connected to the branch line connector and the main line connector and inside, a noise suppression member that suppresses noise propagation.

17. The onboard relay apparatus according to claim 1, further comprising:

a lamp device including a lamp and a switch that outputs a signal indicating for the lamp to turn on or turn off, wherein the control unit turns on or turns off the lamp in accordance with the output signal.

\* \* \* \* \*